(12) United States Patent
Takahashi et al.

(10) Patent No.: US 6,545,703 B1
(45) Date of Patent: Apr. 8, 2003

(54) ELECTRONIC ENDOSCOPE

(75) Inventors: Tadashi Takahashi, Saitama (JP);
Kohei Iketani, Saitama (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/344,524

(22) Filed: Jun. 25, 1999

(30) Foreign Application Priority Data

Jun. 26, 1998 (JP) ............................................ 10-181171

(51) Int. Cl.$^7$ ............................ H04N 7/18; H04N 5/21; H04N 5/14
(52) U.S. Cl. ........................... 348/69; 348/71; 348/625; 348/672
(58) Field of Search ............................. 348/61, 65, 69, 348/71, 625, 672; 600/180

(56) References Cited

U.S. PATENT DOCUMENTS

| | | | |
|---|---|---|---|
| 4,967,269 A | * 10/1990 | Sasagawa et al. | 348/69 |
| 5,239,378 A | * 8/1993 | Tsuji et al. | 348/625 |
| 5,257,100 A | 10/1993 | Hattori et al. | 348/65 |
| 5,294,986 A | * 3/1994 | Tsuji et al. | 348/672 |
| 5,339,159 A | * 8/1994 | Nakamura et al. | 348/71 |
| 5,550,582 A | * 8/1996 | Takasugi et al. | 348/65 |
| 6,080,104 A | * 6/2000 | Ozawa et al. | 600/180 |
| 6,154,248 A | * 11/2000 | Ozawa et al. | 348/65 |
| 6,319,198 B1 | * 11/2001 | Takahashi | 600/180 |

* cited by examiner

*Primary Examiner*—Chris Kelley
*Assistant Examiner*—Allen Wong
(74) *Attorney, Agent, or Firm*—Greenblum & Bernstein, P.L.C.

(57) ABSTRACT

In an electronic endoscope, a flexible scope has an image sensor provided at a distal end thereof. A video-signal processing unit, to which a proximal end of the flexible scope is connected, processes image signals read from the sensor. A light source is provided in the unit, and light, emitted from the light source, is guided through the scope and radiates from the distal end. An aperture-stop is associated with the source that regulates the radiation of light from the distal end. An aperture-stop is controlled in accordance with the luminance-signal-histogram, such that an image having a constant luminance level is reproduced in accordance with the processed image signals. When a localized halation occurs on the reproduced image, the aperture-stop is controlled such that the radiation of light from the distal end is forcibly decreased, thereby avoiding the occurrence of the localized halation.

12 Claims, 18 Drawing Sheets

ELECTRONIC ENDOSCOPE

BACKGROUND OF THE INVENTION

1. Field of the Invention

This invention relates to an electronic endoscope comprising a flexible conduit or scope and a video-signal processing unit to which the flexible scope is detachably connected at a proximal end.

2. Description of the Related Art

In such an electronic endoscope, the flexible scope includes an objective lens system provided at the distal end thereof, and a solid image sensor, such as a CCD (charge-coupled-device) image sensor, associated therewith. The flexible scope also includes an optical light guide extended therethrough, formed as a bundle of optical fibers, which is associated with a lighting lens system provided at the distal end of the flexible scope.

On the other hand, the video-signal processing unit includes a white-light source, such as a halogen lamp, a xenon lamp or the like. When the flexible scope is connected to the video-signal processing unit, the proximal end of the optical light guide is optically connected to the light source. Thus, an object to be photographed is illuminated by light radiating from the distal end of the optical light guide, and is focused as an optical image on a light-receiving surface of the CCD image sensor by the objective lens system.

The focused optical image is converted into a frame of analog image-pixel signals by the CCD image sensor. Then, the frame of analog image-pixel signals is read from the CCD image sensor, and is fed to the video-signal processing unit, in which the image-pixel signals are suitably processed, thereby producing a video signal including image-pixel signals and various synchronizing signals. Then, the video signal is fed from the video-signal processing unit to a TV monitor to reproduce the photographed object on the monitor on the basis of the video signal.

In general, the objective lens system, used in the electronic endoscope, exhibits a large depth of focus, because a close-range object image and/or a distant-range object image to be photographed must be focused on the light-receiving surface of the CCD image sensor by the objective lens system, before the photographed close-range object image and/or distant-range object image can be sharply reproduced on the monitor.

In this case, to maintain a constant overall luminance of a reproduced object image on the monitor, the radiation of the illuminating-light from the distal end of the optical light guide should be regulated in accordance with a distance between the photographed object image and the distal end of the optical light guide. For example, when only a medical image of a patient is to be reproduced as a close-up image by placing the distal end of the flexible scope close to the medical image, the radiation of the illuminating-light should be lowered to a minimum level in order to generate the medical image at a predetermined luminance on the monitor. Then, as the distal end of the flexible scope is moved away from the medical image, the radiation of the illuminating-light should be gradually increased from the minimum level to prevent the luminance of the reproduced medical image from being reduced.

Conventionally, for a regulation of radiation of the illuminating-light from the distal end of the optical light guide, an aperture-stop is associated with the white-light source, and is automatically controlled such that an overall luminance of the reproduced object image is always maintained at a constant level. In particular, a frame of luminance signals is extracted from the video signal at given regular time-intervals, and an average luminance level is calculated from the extracted luminance signals. Then, the radiation of the illuminating-light from the distal end of the optical light guide is regulated by controlling the aperture-stop such that the average luminance level coincides with a predetermined reference level.

In the conventional automatic control of the overall luminance of the reproduced object image, a localized halation frequently occurs on the reproduced image displayed on the monitor. Note, in this field, a halation is defined as a phenomenon in which a luminance level of a reproduced image on a monitor becomes abnormally high to be thereby whitened.

In particular, when an object image having a localized protrusion is photographed by the CCD image sensor such that the localized protrusion is close to the distal end of the flexible scope, and such that the remaining area of the object image is relatively far from the distal end of the flexible scope, a localized halation may occur at a localized area of a reproduced image on the monitor, corresponding to the localized protrusion of the photographed object image. This is because, although an aperture area of the aperture-stop has a tendency toward being widened due to the remaining area of the object image being relatively far from the distal end of the flexible scope, the localized protrusion is close to the distal end of the flexible scope.

Of course, the localized halation should be prevented, because a proper and detailed view of the reproduced image on the monitor is hindered due to the occurrence of the localized halation.

SUMMARY OF THE INVENTION

Therefore, an object of the present invention is to provide an electronic endoscope, which is constituted such that an occurrence of a localized halation on a reproduced object image displayed by a monitor can be effectively prevented.

In accordance with the present invention, there is provided an electronic endoscope which comprises a flexible scope having an image sensor provided at a distal end of the scope, and a video-signal processing unit to which a proximal end of the flexible scope is connected. Preferably, the connection of the distal end of the flexible scope to the video-processing unit is detachable. Image-pixel signals, successively read from the image sensor, are processed by the video-signal processing unit. A light source is provided in the video-signal processing unit such that light, emitted from the light source, is guided through the flexible scope and radiates from the distal end of the flexible scope. A light-emission regulator is associated with the light source to regulate the radiation of light from the distal end of the flexible scope. The electronic endoscope further comprises a histogram generator that successively generates a luminance-signal-histogram in accordance with the processed image-pixel signals, a first controller that controls the light-emission regulator in accordance with the luminance-signal-histogram, such that an image having a constant luminance level is reproduced in accordance with the processed image-pixel signals, a determiner that determines whether a localized halation occurs on the reproduced image on the basis of the luminance-signal-histogram, and a second controller that controls the light-emission regulator to forcibly decrease the radiation of light from the distal end of the flexible scope, thereby avoiding the localized halation occurrence.

In the histogram generator, the generation of the luminance-signal-histogram by the histogram generator may be based on either a frame of image-pixel signals or a field of image-pixel signals, extracted from the processed image-pixel signals. The first controller may include a calculator that calculates an average luminance level-value in accordance with luminance signals representing luminance levels of the luminance-signal-histogram. In this case, the light-emission regulator is controlled by the first controller such that the average luminance level-value coincides with a given reference-luminance-level-value. Preferably, the electronic endoscope may be provided with a manual adjuster that adjusts a magnitude of the reference-luminance-level-value.

Preferably, the electronic endoscope further comprises a monitor that monitors whether a difference between the average luminance level-value and the reference-luminance-level value is more than a predetermined relatively-large threshold value over a given time period after the localized halation occurrence, and a halation-avoidance-determiner that determines that the localized halation occurrence is avoided when it is confirmed by the monitor that the difference is more than the predetermined relatively-large threshold value over the given time period.

The determiner includes a frequency calculator that calculates a specific frequency of luminance signals, included in a specific range of the luminance-signal-histogram bounded by a maximum luminance level and a given specific luminance level thereof, and determines whether the localized halation occurs based on the specific frequency of luminance signals.

In accordance with an aspect of the present invention, the determiner includes a ratio calculator that calculates a ratio of the specific frequency of luminance signals to a total number of luminance signals included in the luminance-signal-histogram, and a comparator that compares the ratio with a given threshold value. In this case, it is determined by the determiner that the localized halation occurs when the ratio exceeds the threshold value.

The determiner may further include a numerical estimator that numerically estimates a magnitude of the ratio, and a halation-degree-determiner that determines a degree of the localized halation in accordance with the numerical estimation of the magnitude of the ratio. In this case, the forcible decrease in the radiation of light from the distal end of the flexible scope is performed by the second controller in accordance with the degree of the occurrence of the localized halation.

In accordance with another aspect of the present invention, the determiner includes a comparator that compares the specific frequency of luminance signals with a given threshold value. In this case, the determiner determines that the localized halation occurs when it is confirmed by the comparator that the specific frequency of luminance signals exceeds the threshold value.

In accordance with yet another aspect of the present invention, the determiner includes an indicator that indicates the localized halation occurrence. In this case, the forcible decrease in the radiation of light from the distal end of the flexible scope is performed by the second controller when the localized halation occurrence is indicated by the indicator.

BRIEF DESCRIPTION OF THE DRAWINGS

The object and other objects of the present invention will be better understood from the following description, with reference to the accompanying drawings in which.

DESCRIPTION OF THE PREFERRED EMBODIMENTS

Figure 1:
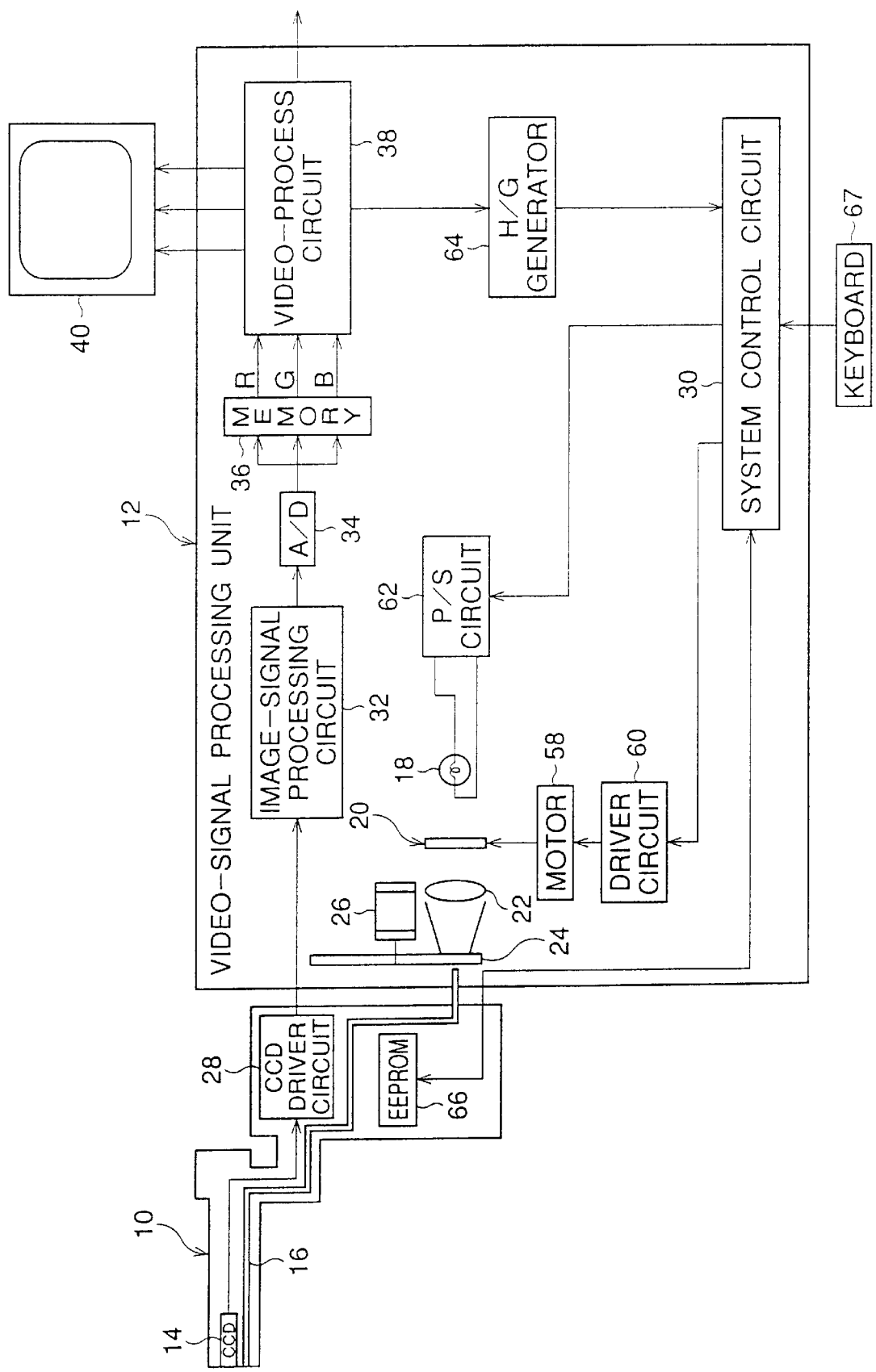
FIG. 1 is a schematic block diagram of an electronic endoscope according to the present invention.

With reference to FIG. 1, an electronic endoscope according to the present invention is shown as a block diagram. The electronic endoscope comprises a flexible conduit or scope 10, and a video-signal processing unit 12 to which the flexible scope 10 is detachably attached.

The flexible scope 10 includes an objective lens system (not shown) provided at the distal end thereof, and a solid image sensor 14, such as a CCD (charge-coupled-device) image sensor, associated therewith. An optical object to be photographed is focused, as an optical image, on a light-receiving surface of the CCD image sensor 14 by the objective lens system.

The flexible scope 10 also includes an optical light guide 16 extended therethrough and formed as a bundle of optical fibers. The optical light guide 16 terminates at a light-radiating end face at the distal end of the flexible scope 10, and is associated with a lighting lens system (not shown) provided thereat. When the flexible scope 10 is connected to the video-signal processing unit 12, the proximal end of the optical light guide 16 is optically connected to a white-light source 18, such as a halogen lamp, a xenon lamp or the like, provided in the video-signal processing unit 12. The light, emitted from the white-light source or lamp 18, is directed to the proximal end of the optical light guide 16, and then radiates as an illuminating-light from the distal end of the optical light guide 16.

As shown in FIG. 1, an aperture-stop 20 and a condenser lens 22 are provided between the white-light lamp 18 and the proximal end of the optical light guide 16. The aperture-stop 20 is used to adjust an amount of the light directed from the lamp 18 to the proximal end of the optical light guide 16, i.e. an amount of the illuminating-light radiating from the distal end of the optical light guide 16. The condenser lens 22 is used to converge the light, emitted from the lamp 18, on the proximal end of the optical light guide 16.

In this embodiment, for reproduction of a photographed image as a color image, an RGB field sequential-type color imaging system is incorporated in the electronic endoscope. Thus, a rotary RGB color filter disk 24 is interposed between the white-light lamp 18 and the proximal end of the optical light guide 16 of the video-signal processing unit 12.

Figure 2:
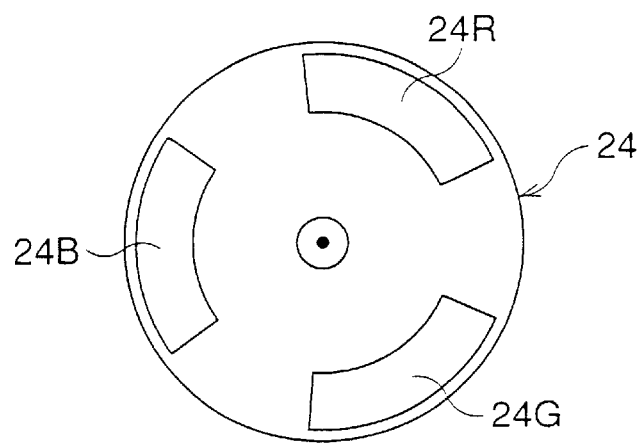
FIG. 2 is a front view of a rotary RGB color filter disk used in the electronic endoscope of FIG. 1.

As shown in FIG. 2, the rotary RGB color filter disk 24 has three sector-shaped color filters, i.e. a red filter 24R, a green filter 24G and a blue filter 24B, and these color filters 24R, 24G and 24B are circumferentially and uniformly arranged such that three centers of the color filters 24R, 24G and 24B are spaced from each other at regular angular-intervals of 120 degrees. A sector area between two adjacent color filters (24R and 24G; 24G and 24B; or 24B and 24R) serves as a light-shielding area.

Figure 3:
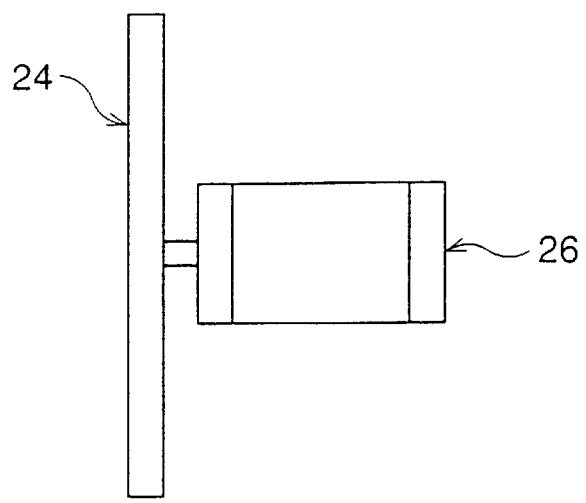
FIG. 3 is a side view of the rotary RGB color filter disk block mounted on a shaft of an electric motor.

As shown in FIG. 3, the rotary RGB color filter disk 24 is rotated by an electric motor 26, such as a servo-motor, a stepping motor or the like, at a given rotational frequency in accordance with a used image-reproduction method, such as the NTSC system, the PAL system or the like, whereby an optical object to be photographed is sequentially illuminated by red light, green light and blue light. In particular, in the NTSC system, the rotational frequency of the color filter disk 24 is 30 Hz, and, in the PAL system, the rotational frequency of the color filter disk 24 is 25 Hz.

For example, in the NTSC system, the color filter disk 24 makes one revolution over a time period of 1/30 sec, and thus the light, emitted from the lamp 18, passes through each of the color filters 24R, 24G and 24B over a time period of 1/180 sec. Namely, a red light, green light and a blue light intermittently and cyclically radiate from the distal end of the optical light guide 16, and a red optical image, a green optical image and a blue optical image are sequentially and cyclically focused on the light-receiving surface of the CCD image sensor 14.

Each of the red, green and blue optical images is sequentially converted into a frame of monochromatic (red, green, blue) analog image-pixel signals by the CCD image sensor 14, and the monochromatic (red, green, blue) analog image-pixel signals are successively read from the CCD image sensor 14 over consecutive light-shielding time periods corresponding to the light-shielding areas between two adjacent color filters (24R and 24G; 24G and 24B; or 24B and 24R). The reading of the monochromatic (red, green, blue) analog image-pixel signals from the CCD image sensor 14 is performed in accordance with a series of clock pulses, having a given frequency, output from a CCD driver circuit 28 provided in the flexible scope 10.

As shown in FIG. 1, the video-signal processing unit 12 is provided with a system control circuit 30, which may be constituted as a microcomputer, used to control the electronic endoscope as a whole, comprising, for example, a central processing unit (CPU), a read-only memory (ROM) for storing programs and constants, a random-access memory (RAM) for storing temporary data, and an input/output interface circuit (I/O).

The video-signal processing unit 12 is provided with an image-signal processing circuit 32, which is connected to the CCD driver circuit 28 when the flexible scope 10 is attached to the video-signal processing unit 12. The monochromatic analog image-pixel signals, read from the CCD image sensor 14 by the CCD driver circuit 28, are fed to the image-signal processing circuit 32, in which the monochromatic image-pixel signals are subjected to various image-processings, such as a white-balance correction processing, a gamma-correction processing, a profile-enhancing processing and so on. Note, the reading of the monochromatic image-pixel signals from the CCD image sensor 14 by the CCD driver circuit 28 and the processing of the monochromatic image-pixel signals in the image-signal processing circuit 32 are performed under control of the system control circuit 30.

The monochromatic analog image-pixel signals, suitably processed in the image-signal processing circuit 32, are fed to an analog-to-digital (A/D) converter 34, and are converted by the A/D converter 34 into monochromatic digital image-pixel signals which are temporarily stored in a frame memory 36. In this frame memory 36, three frame memory sections are defined for the storage of red digital image-pixel signals, green digital image-pixel signals and blue digital image-pixel signals, respectively. In short, the monochromatic digital image-pixel signals are stored in a corresponding frame memory section defined in the frame memory 36.

Then, the respective red, green and blue digital image-pixel signals are simultaneously read from the three frame memory sections of the frame memory 36, and are output to a video-process circuit 38, as a red digital video signal R, a green digital video signal G and a blue digital video signal B, respectively. Namely, each of the red, green and blue digital video signals R, G and B is produced by suitably adding various synchronizing signals to the monochromatic (red, green, blue) digital image-pixel signals read from the frame memory 36.

In the video-process circuit 38, the red digital video signal R, the green digital video signal G and the blue digital video signal B are converted into a red analog video signal, a green analog video signal and a blue analog video signal, respectively, and each of the red, green and blue analog video signals is processed such that a high frequency noise component is eliminated therefrom. Then, the red, green and blue analog video signals are output from the video process circuit 38 to a monitor 40 to thereby reproduce and display the photographed color image thereon.

Also, the video-process circuit 38 includes a color encoder for producing various types of color digital video signals on the basis of the red, green and blue digital video signals, and the various types of video color digital signals are output from the video-process circuit 38 to various pieces of peripheral equipment (not shown), such as a remote monitor, a video tape recorder, a printer, an image-processing computer and so on.

Figure 4:
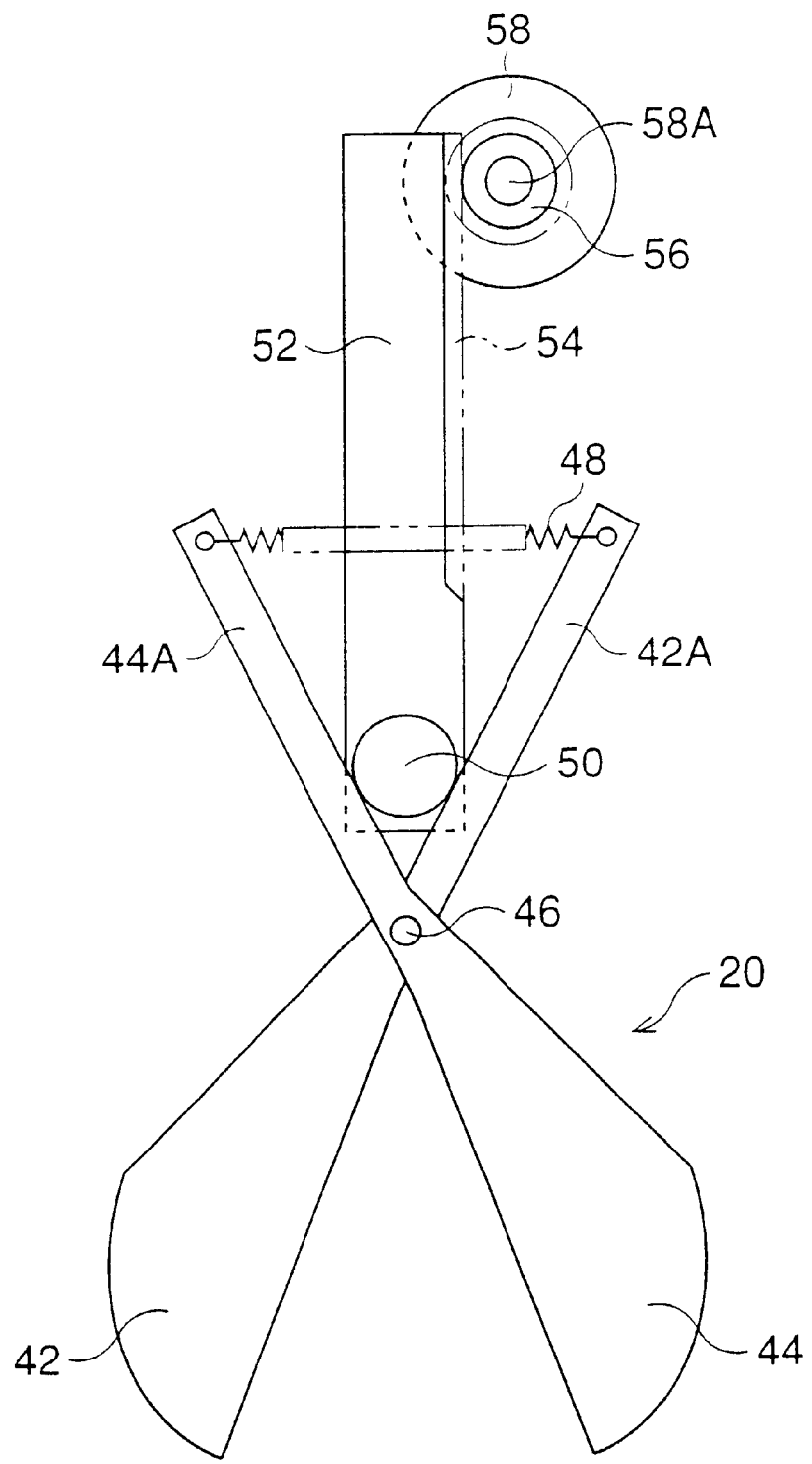
FIG. 4 is a front view of an aperture-stop with a drive mechanism thereof, used in the electronic endoscope of FIG. 1.

As shown in FIG. 4, the aperture-stop 20 comprises a pair of blade elements 42 and 44, each of which has an arm portion (42A, 44A) integrally extending therefrom. The blade elements 42 and 44 are crossed, and are rotatably connected to each other by a pivot pin 46 at the crossing point thereof. Note, the pivot pin 46 is securely and suitably supported by a structural frame (not shown) of the video-signal processing unit 12. The arm portions 42A and 44A are connected to each other by a tensile coil spring 48, and are engaged with a cam pin 50 provided therebetween. The cam pin 50 is securely attached to a lower end of an elongated plate member 52, which is movably supported by suitable guide members (not shown). The elongated plate member 52 is formed with a rack 54, which engages a pinion 56. The pinion 56 is securely mounted on a drive shaft 58A of an electric drive motor 58 securely supported by the structural frame of the video-signal processing unit 12.

With the arrangement as shown in FIG. 4, when the drive motor 58 is driven such that the elongated plate member 52 is lifted, the blade elements 42 and 44 are moved so as to close on each other. On the contrary, when the drive motor 58 is driven such that the elongated plate member 52 is lowered, the blade elements 42 and 44 are moved so as to separate from each other.

Of course, the aperture-stop 20 is provided in the video-signal processing unit 12 in such a manner that the pair of blade elements 42 and 44 intercepts the emission of the light from the lamp 18. Thus, as the blade elements 42 and 44 are moved so as to be spaced apart from each other, an amount of the light passing between the blade elements 42 and 44 gradually increases, and, as the blade elements 42 and 44 are moved so as to close on each other, an amount of the light passing between the blade elements 42 and 44 is gradually reduced. In short, the radiation of the light from the distal end of the optical light guide 16 is regulated by operating the aperture-stop 20.

As shown in FIG. 1, the electric drive motor 58 is driven by a driver circuit 60, which is operated under control of the system control circuit 30. Also, the white-light lamp 18 is electrically energized by a power source circuit 62, which is operated under control of the system control circuit 30.

Also, as shown in FIG. 1, the video-signal processing circuit 12 features a histogram-generating circuit 64. The histogram-generating circuit 64 is connected to the video-process circuit 38 to generate a histogram on the basis of a frame or field of luminance signals, which is successively obtained from a component-type video-signal produced in the video-process circuit 38, and the successively-generated luminance-signal-based histogram is used to automatically regulate the radiation of the light from the distal end of the optical light guide 16, as discussed in detail hereinafter.

Note, the histogram generated in the histogram-generating circuit 64 is renewed at a given regular time-interval in accordance with a used image-reproduction method. For example, when the NTSC system is used in the electronic endoscope as shown in FIG. 1, the renewal of the histogram is performed at a regular time-interval of 1/30 sec, and, when the PAL system is used, the renewal of the histogram is performed at a regular time-interval of 1/25 sec.

As shown in FIG. 1, the flexible scope 10 is provided with a non-volatile memory, such as an electrically-erasable programmable read-only memory (EEPROM) 66, in which various sorts of information data are previously stored. For example, an identification-data of the flexible scope 10 is stored in the EEPROM 66, and a type of the flexible scope 10 concerned can be identified by the identification-data read from the EEPROM 66. Note, the flexible scope 10 may be represented by one of a broncho-type scope, a colon-type scope and a gastro-type scope. Also, an image-pixel number data of the CCD image sensor 14, a clock pulse frequency data for processing image-pixel signals and so on are stored in the EEPROM 66. When the flexible scope 10 is connected to the video-signal processing unit 12, the various sorts of information data are read from the EEPROM 66, and are stored in the RAM of the system control circuit 30.

As shown in FIG. 1, a keyboard 67 is connected to the system control circuit 30, and various commands and various data are input to the system control circuit 30 through the keyboard 67, if necessary.

Figure 5:
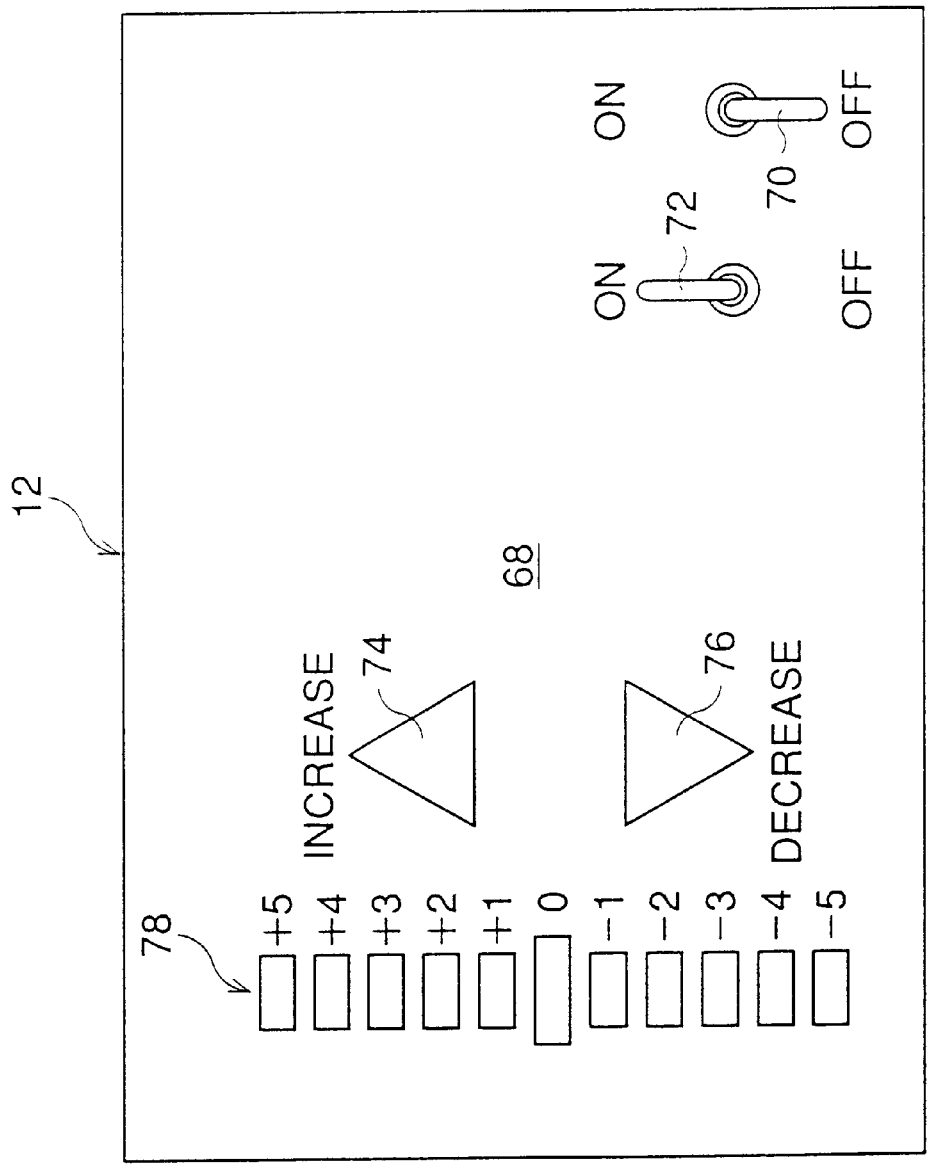
FIG. 5 is a front view of a manipulation panel of a video-signal processing unit forming a part of the electronic endoscope.

As shown in FIG. 5, the video-signal processing unit 12 is provided with a manipulation panel 68, on which various switches are provided. Also, with reference to FIG. 6, relationships between the various switches and the system control circuit 30 are shown as a block diagram. Note, in FIG. 6, the CPU, ROM, RAM and I/O of the system control circuit 30 are indicated by references 30A, 30B, 30C and 30D, and these elements are connected to each other through respective buses.

Figure 6:
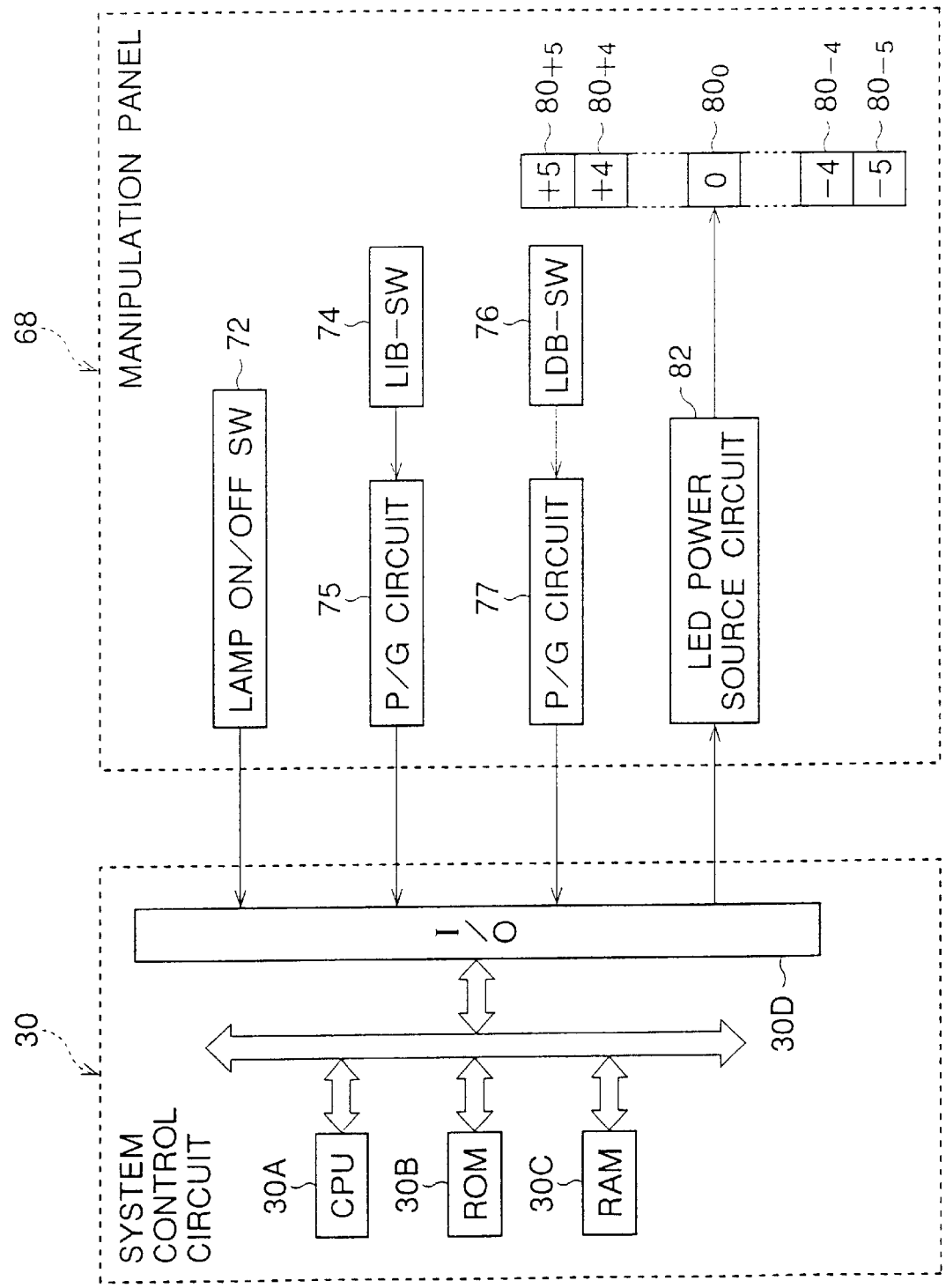
FIG. 6 is block diagram showing relationships between various switches provided on the manipulating panel and a system control circuit shown in FIG. 1.

In FIG. 5, reference 70 indicates a power ON/OFF switch for the video-signal processing unit 12, and by a turning-ON of the power ON/OFF switch 70, the video-signal processing unit 12 is fed with electrical power from a network power source. In FIGS. 5 and 6, reference 72 indicates a lamp ON/OFF switch for the lamp 18, and, by a turning-ON of the lamp ON/OFF switch 72, the power source circuit 62 is operated under control of the system control circuit 30, whereby the lamp 18 is lit.

Also, the manipulation panel 68 is provided with a luminance-increase switch button 74 associated with a pulse-generating circuit 75, and a luminance-decrease switch button 76 associated with a pulse-generating circuit 77, which are used to manually regulate the radiation of the light from the distal end of the flexible scope 10, whereby a luminance level of a reproduced image on the monitor 40 can be manually changed.

Every time the luminance-increase switch button 74 is depressed, a pulse signal is output from the pulse-generating circuit 75 to the system control circuit 30 via the I/O 30D, whereby a reference-luminance-level-value ($Y_r$) defined in the system control circuit 30, is stepwisely increased. Also, while the depression of the switch button 74 is continuously maintained, the pulse signals are successively output from the pulse-generating circuit 75 at regular intervals of suitable time, whereby the reference-luminance-level-value ($Y_r$) is gradually and stepwisely increased.

On the contrary, every time the luminance-decrease switch button 76 is depressed, a pulse signal is output from the pulse-generating circuit 77 to the system control circuit 30 via the I/O 30D, whereby the reference-luminance-level-value ($Y_r$) is stepwisely decreased. Also, while the depression of the switch button 76 is continuously maintained, the pulse signals are successively output from the pulse-generating circuit 75 at the regular intervals of suitable time, whereby the reference-luminance-level-value ($Y_r$) is gradually and stepwisely decreased.

Note, as stated in detail hereinafter, the greater the reference-luminance-level-value ($Y_r$) the higher an overall luminance level of a reproduced image on the monitor 40, and vice versa.

When the luminance level of the reproduced image on the monitor 40 is changed by manually operating one of the switch buttons 74 and 76, it is necessary to indicate a base line level of the luminance level of the reproduced image displayed by the monitor 40. To this end, the manipulation panel 68 is provided with a luminance-level indicator 78 including a column of eleven window-sections to which level-references "+5", . . . "+4", . . . "−4" and "−5" are affixed, respectively, as shown in FIG. 5. Each of the window-sections is formed of a semi-transparent plate or light-diffusing plate, and a central window-section, which features the level-reference "0", is somewhat larger than the remaining window-sections to aid an operator. As is apparent from FIG. 6, the eleven window-sections are associated with light-emitting diodes (LED's) $80_{+5}$, . . . $80_{+4}$, . . . $80_{-4}$ and $80_{-5}$, respectively, which are selectively lit by an LED power source circuit 82 operated under control of the system control circuit 30, as discussed in detail hereinafter.

Figure 7:
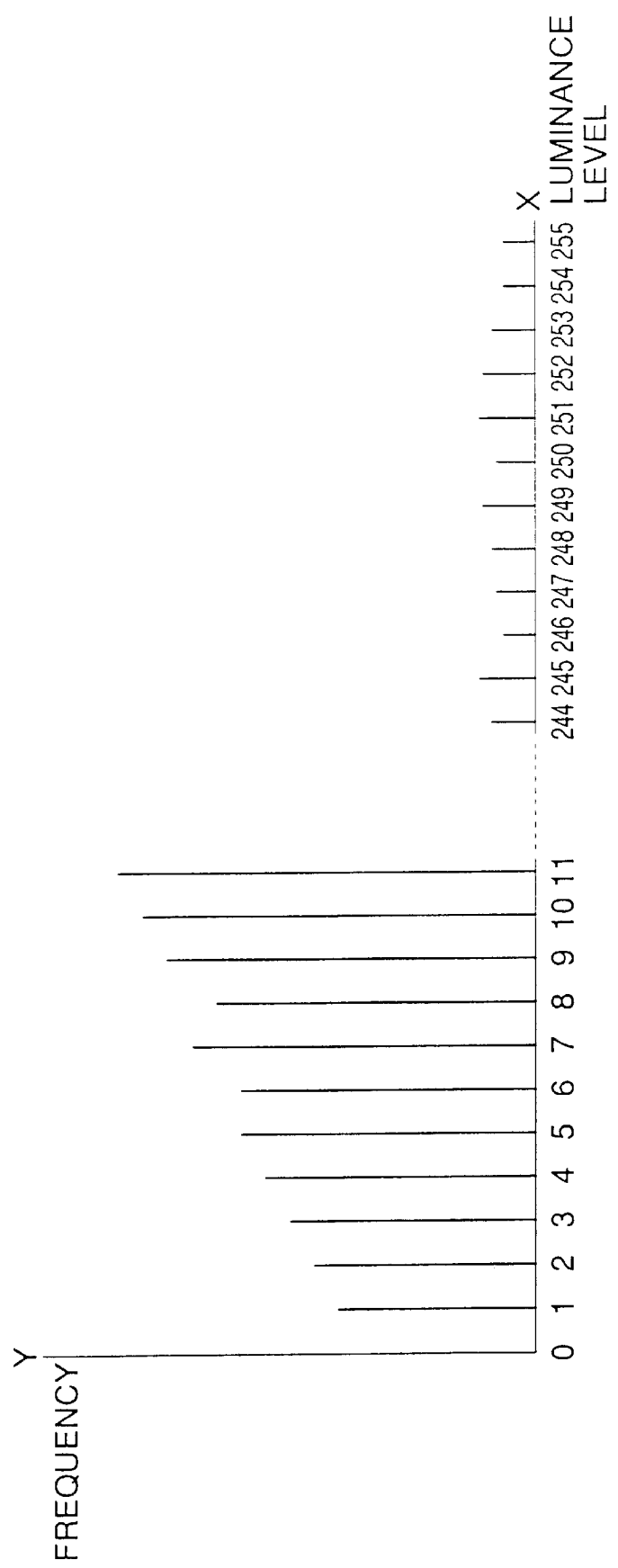
FIG. 7 is a graph showing a histogram, by way of example, generated in a histogram generating circuit of the electronic endoscope of FIG. 1 on the basis of a frame or field of luminance signals.

FIG. 7 shows a histogram, by way of example, which is generated, in the histogram-generating circuit 64, on the basis of a frame or field of luminance signals obtained from the video-process circuit 38. In this histogram, the abscissa "X" represents a distribution of luminance levels of all of the luminance signals included in one frame or field, and the ordinate "Y" represents a frequency or number of luminance signals exhibiting a same luminance level. The luminance-signals included in one frame or field are sorted by 256 luminance levels, which define a full histogram-definition range ($0 \leq X \leq 255$). Note, a luminance level "0" represents a minimum luminance level-value corresponding to a pedestal level-value of the video signal produced in the video-process circuit 38, and a luminance level of "255" represents a maximum luminance level-value.

To automatically regulate a radiation of light from the distal end of the flexible scope 10, an average-luminance-level-value "$Y_a$" is calculated from a histogram successively generated in the histogram-generating circuit 64, as follows:

$$Y_\gamma = \frac{\sum_{\varphi=\eta}^{\varphi=\theta KK} L_\varphi * S_\varphi}{f_\omega}$$

$$f_\eta = \sum_{\varphi=\eta}^{\varphi=\theta KK} S_\varphi$$

Herein:
  "$L_n$" is a luminance level-value corresponding to a luminance level "n", which may be a numerical value;
  "$s_n$" is a number (frequency) of luminance signals exhibiting the luminance level "n"; and
  "$f_o$" is a total number of luminance signals included in the histogram.

The calculated average-luminance-level-value "$Y_a$" is compared with the aforementioned reference-luminance-level-value "$Y_r$", and an aperture area of the aperture-stop 20 is adjusted such that the average luminance level value "$Y_a$" reaches the reference-luminance-level-value "$Y_r$", whereby a radiation of light from the distal end of the flexible scope 10 is regulated so that a constant luminance of a reproduced image on the monitor 40 can be maintained.

In particular, when the average-luminance-level-value "$Y_a$" is greater than the reference-luminance-level-value "$Y_r$", the aperture-stop 20 is adjusted so that the aperture area thereof is stepwisely reduced until a difference between the average luminance level value "$Y_a$" and the reference-luminance-level-value "$Y_r$" falls within a permissible small range. Also, when the average-luminance-level-value "$Y_a$" is smaller than the reference-luminance-level-value "$Y_r$", the aperture-stop 20 is adjusted so that the aperture area thereof is stepwisely increased until a difference between the average luminance level value "$Y_a$" and the reference-luminance-level-value "$Y_r$" falls in the permissible small range. Thus, it is possible for the reproduced image on the monitor 40 to maintain a constant luminance level in accordance with the reference-luminance-level-value "$Y_r$".

Note, as mentioned above, by operating one of the luminance-increase switch button 74 and the luminance-decrease switch button 76, the reference-luminance-level-value "$Y_r$" can be varied. Namely, when it is desired by the operator that an overall luminance of a reproduced image on the monitor 40 is to be made higher, the reference-luminance-level-value "$Y_r$" is increased by operating the luminance-increase switch button 74. Also, when it is desired that an overall luminance of a reproduced image on the monitor 40 is to be made lower, the reference-luminance-level-value "$Y_r$" is decreased by operating the luminance-decrease switch button 76.

As discussed hereinbefore, when an object image having a localized protrusion is photographed by the CCD image sensor 14, such that the localized protrusion is close to the distal end of the flexible scope 10, and such that the remaining area of the object image is relatively far from the distal end of the flexible scope 10, a localized halation may occur at a localized area of a reproduced object image on the monitor 40, corresponding to the localized protrusion of the photographed object image.

Namely, in this case, the average-luminance-level-value "$Y_a$" has a tendency toward being reduced, because the remaining area of the object image is relatively far from the distal end of the flexible scope 10. Accordingly, an aperture area of the aperture-stop 20 must become larger before the average-luminance-level-value "$Y_a$" can coincide with the reference-luminance-level-value "$Y_r$", resulting in the localized halation occurring at a portion of the image corresponding to the localized protrusion, which is close to the distal end of the flexible scope 10.

When such a localized halation occurs, a corresponding histogram exhibits a recognizable spike. Therefore, it is possible to determine an occurrence of the localized halation by detecting the spike from the histogram concerned.

Figure 8:
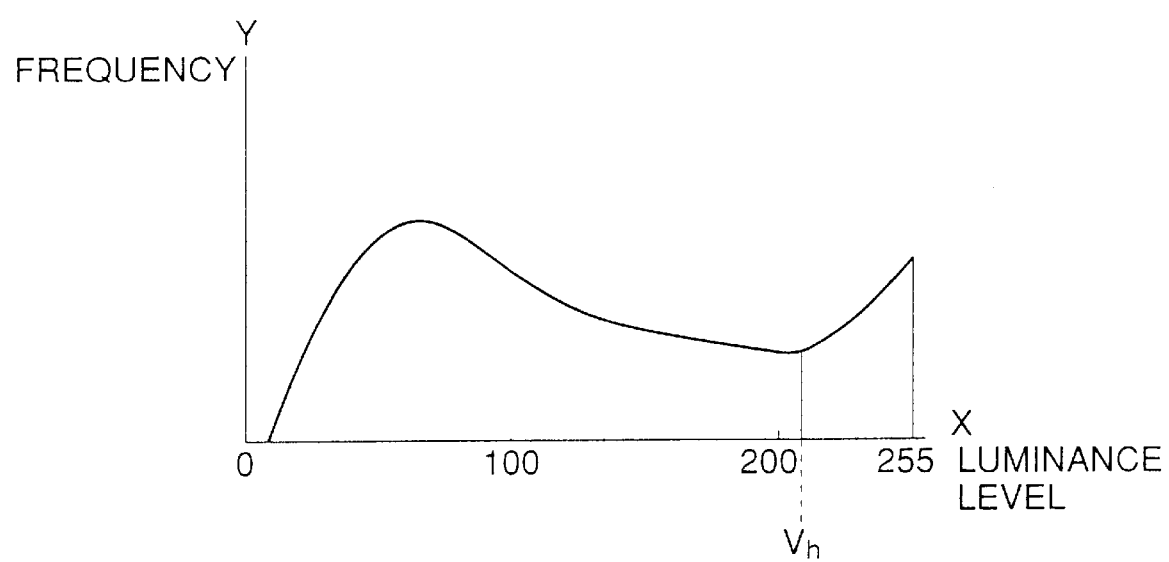
FIG. 8 is a graph showing a histogram featuring an occurrence of a localized halation.

In particular, as shown by way of example in FIG. 8, when the localized halation occurs, a specific frequency (number) "$f_H$" of luminance signals, included in a specific range of the histogram bounded by the maximum luminance level "255" and a given specific luminance level "$V_h$", abnormally increases. According to the present invention, the abnormal increase in the specific frequency (number) "$f_H$" is determined as being an occurrence of the localized halation spike.

For example, according to an aspect of the present invention, the specific frequency "$f_H$" is estimated as a ratio "$t_r$" of "$f_H$" to "$f_o$". Note, as defined by the above-mentioned formula, "$f_o$" indicates the total number of luminance signals included in the histogram. The ratio "$t_r$" is compared with a predetermined threshold value "$F_r$", whereby it is determined whether the localized halation occurs. Namely, when the ratio "$t_r$" exceeds the threshold value "$F_r$", it is determined that there is the occurrence of the localized halation, and, when the ratio "$t_r$" is less than the threshold value "$F_r$", it is determined that there is no occurrence of the localized halation.

Although the given luminance level "$V_h$" may be suitably selected from, for example, a luminance level-range between luminance levels "200" and "230", it is preferable to set the luminance level "$V_h$" in accordance with a type of the flexible scope 10 utilized, and therefore a type of the CCD image sensor 14 used therein. Similarly, although the threshold value "$F_r$" may be suitably selected, it is preferable to set the threshold value "$F_r$" in accordance with the type of flexible scope 10 utilized, and therefore the type of CCD image sensor 14 used therein.

At present, there are more than twenty types of flexible scope 10, which are connectable to the common video-signal processing unit 12, and these types of flexible scope 10 may be sorted into three categories: a first category of flexible scope represented by the broncho-type scope; a second category of flexible scope represented by the colon-type scope; and a third category of flexible scope represented by the gastro-type scope. Note, of course, each of the three categories of flexible scope features a certain type of CCD image sensor (14) used therein.

For example, in the first category of flexible scope (broncho-type scope), $V_h$=210 and $F_r$=0.13; in the second category of flexible scope (colon-type scope), $V_h$=210 and $F_r$=0.20; in the third category of flexible scope (gastro-type scope), $V_h$=225 and $F_r$=0.13.

Figure 9:
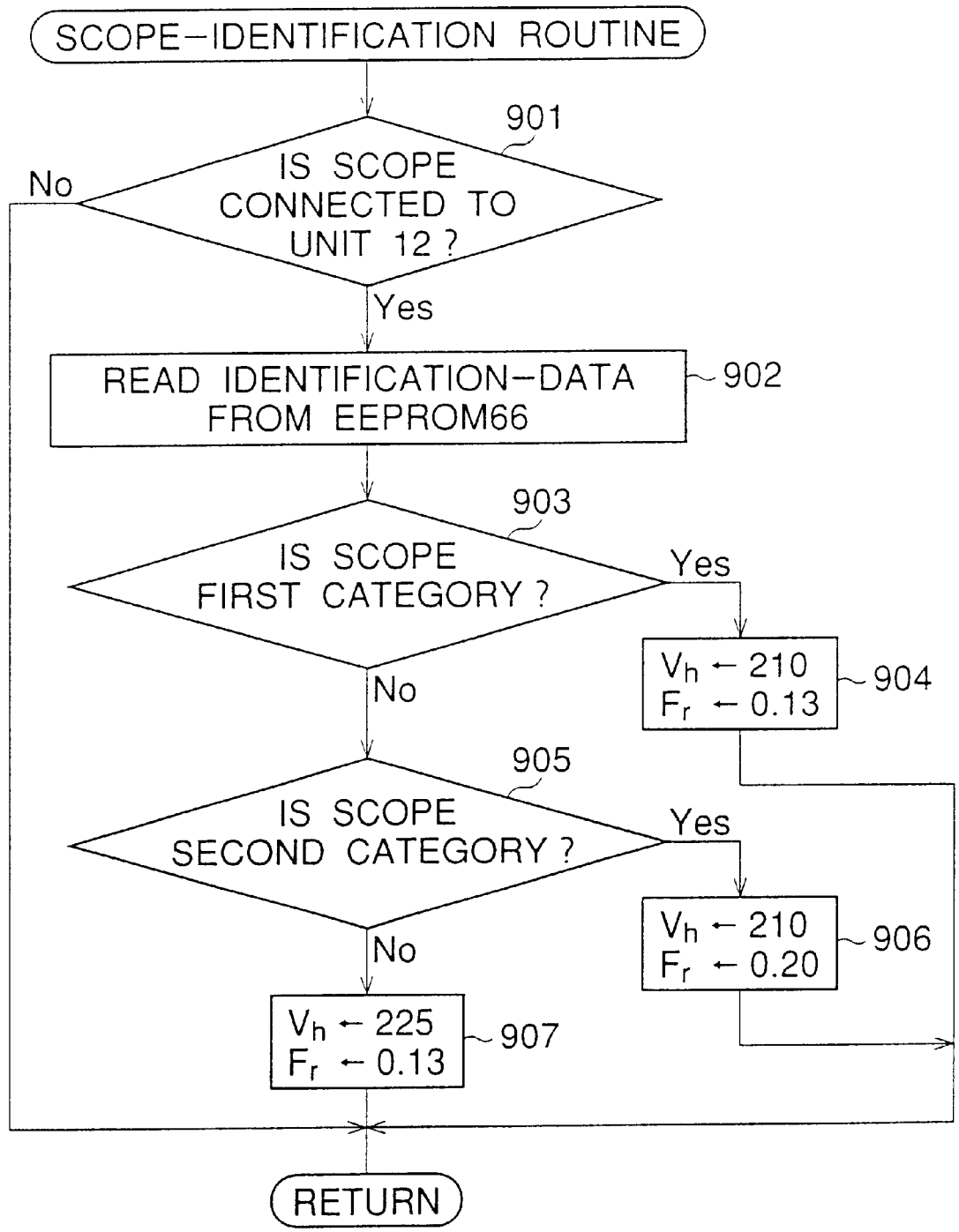
FIG. 9 is a flowchart of a scope-identification routine executed in the system control circuit of the electronic end scope of FIG. 1.

FIG. 9 shows a flowchart of a scope-identification routine, executed by the system control circuit 30, which is constituted as a time-interruption routine. This time-interruption routine is repeatedly executed at a regular interval of suitable short time, and an execution of the time-interruption routine is started by turning ON the power ON/OFF switch 70 (FIG. 5).

At step 901, it is determined whether a flexible scope (10) is connected to the video-signal processing unit 12. When the flexible scope (10) concerned is not connected to the video-signal processing unit 12, the routine once ends. In short, at step 901, it is monitored whether any flexible scope (10) is connected to the video-processing unit 12, and there is no progress until the connection of a flexible scope (10) to the video-signal processing unit 12 is confirmed.

At step 901, when the connection of a flexible scope (10) to the video-signal processing unit 12 is confirmed, the control proceeds to step 902, in which an identification-data is read from an EEPROM (66) of the connected flexible scope (10), which is temporarily stored in the RAM 30C (FIG. 6) of the system control circuit 30. Note, of course, at this time, the other information data are also read from the EEPROM (66) and stored in the RAM 30C.

At step 903, it is determined whether the connected scope (10) is of the first category of flexible scope, represented by the broncho-type scope. When the connected scope (10) is of the first category of flexible scope, the control proceeds to step 904, in which the two settings of "210" and "0.13" are given to the luminance level "$V_h$" and the threshold value "$F_r$", respectively.

At step 903, when the connected scope (10) is not of the first category of flexible scope, the control proceeds from step 903 to step 905, in which it is determined whether the connected scope (10) is of the second category of flexible scope, represented by the colon-type scope. When the connected scope (10) is of the second category of flexible scope, the control proceeds to step 906, in which the two settings of "210" and "0.20" are given to the luminance level "$V_h$" and the threshold value "$F_r$", respectively.

At step 905, when the connected scope (10) is not of the second category of flexible scope, it can be confirmed that the connected scope (10) is of the third category of flexible scope, represented by the gastro-type scope. Thus, the control proceeds from step 905 to step 907, in which the two settings of "225" and "0.13" are given the luminance level "$V_h$" and the threshold value "$F_r$", respectively.

Of course, during an operation of the video-signal processing unit 12, when the flexible scope (10) concerned is disconnected therefrom, and when another type of flexible scope is connected thereto, the luminance level "$V_h$" and the threshold value "$F_r$" are reset in accordance with a scope-identification data, read from a respective EEPROM (66), by the execution of the scope-identification routine shown in FIG. 9.

Figure 10:
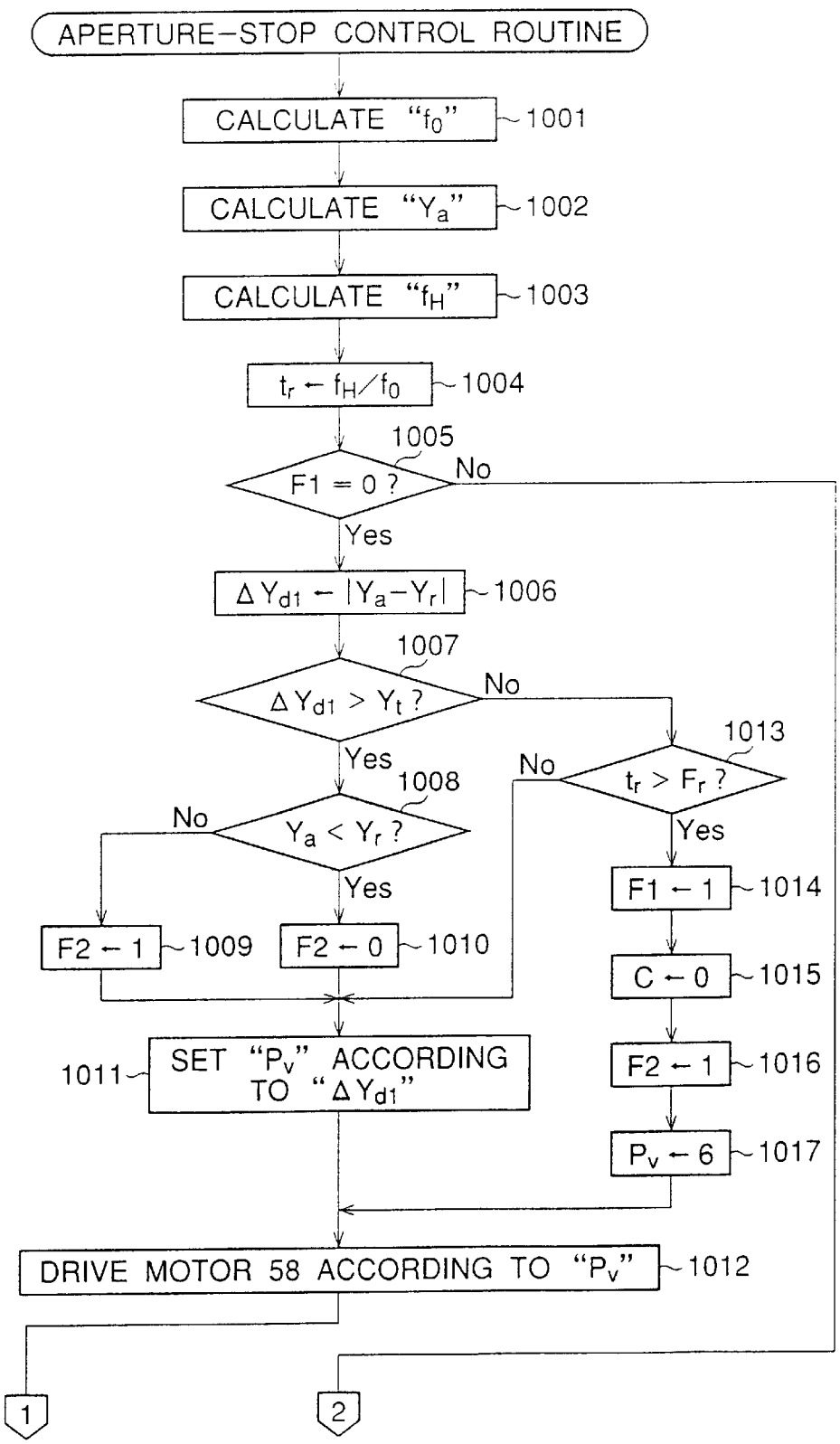
FIG. 10 is a part of a flowchart of an aperture-stop control routine executed in the system control circuit of the electronic endoscope of FIG. 1.
Figure 11:
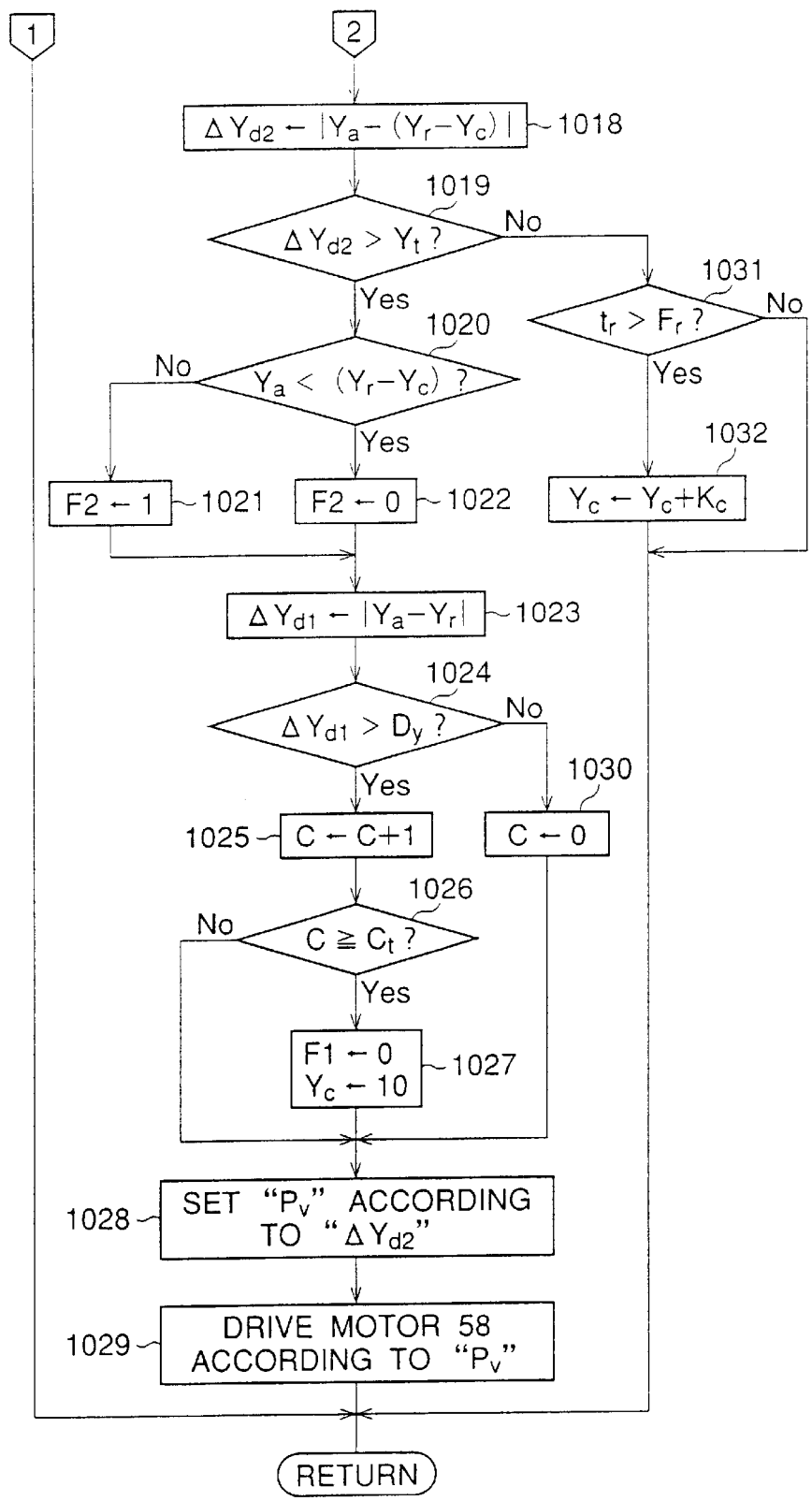
FIG. 11 is a remaining part of the flowchart of the aperture-stop control routine referred to in FIG. 10.

FIGS. 10 and 11 show a flowchart of an aperture-stop control routine executed by the system control circuit 30. This aperture-stop control routine is constituted as a time-interruption routine, and this time-interruption routine is repeatedly executed at a regular time-interval which is predetermined in accordance with a used image-reproduction method, such as the NTSC system, the PAL system or the like. For example, when the PAL system is used, the execution of the time-interruption routine is repeated at a regular time-interval of ⅕₂₅ sec, and, when the NTSC system is used, the execution of the time-interruption routine is repeated at a regular time-interval of ⅕₃₀ sec. Note, an execution of this time-interruption routine may be started by turning ON the power ON/OFF switch 70.

At step 1001, a total number "$f_o$" of luminance signals, included in the full histogram-definition range ($0 \leq X \leq 255$) of a histogram generated in the histogram-generating circuit 64, is calculated. Then, at step 1002, an average-luminance-level-value "$Y_a$" is calculated, using the total number "$f_o$" obtained at step 1001, in accordance with the aforementioned formula.

At step 1003, a specific frequency (number) "$f_H$" of luminance signals, included in the specific range ($V_h \leq X \leq 255$) of the histogram bounded by the maximum luminance level "255" and the specific luminance level "$V_h$", is calculated. Then, At step 1004, the following calculation is executed:

$$t_r \leftarrow f_H/f_o$$

Namely, a ratio "$t_r$" of the specific frequency (number) "$f_H$" to the total number "$f_o$" is calculated, and is temporarily stored in the RAM 30C (FIG. 6) of the system control circuit 30.

At step 1005, it is determined whether a flag F1 is "0" or "1". At an initial stage, since F1=0, the control proceeds to step 1006, in which the following calculation is executed:

$$\Delta Y_{d1} \leftarrow |Y_a - Y_r|$$

Namely, a difference "$\Delta Y_{d1}$" between the average-luminance-level-value "$Y_a$" and the reference-luminance-level-value "$Y_r$" is calculated.

As mentioned above, the reference-level-value "$Y_r$" is stepwisely changeable by operating one of the switch buttons 74 and 76, but is limited to a suitable range, for example, bounded by luminance levels "80" and "180". At an initial stage in the execution of the routine, as the base line luminance value, a neutral luminance level of "130" within the changeable range is assigned to the reference-value "$Y_r$", and the neutral LED 80₀ (FIG., 6) is lit.

Whenever the luminance-increase-switch button 74 is depressed, the reference-level-value "$Y_r$" is stepwisely increased from the base line neutral luminance level "130" towards the luminance level "180" in increments of ten, and the LED's 80₊₁, 80₊₂, 80₊₃, 80₊₄ and 80₊₅ are successively lit in accordance with the stepwisely increase of the reference-level-value "$Y_r$". On the other hand, whenever the luminance-decrease-switch button 76 is depressed, the reference-level-value "$Y_r$" is stepwisely decreased from the base line neutral luminance level "130" to the luminance level "80" in decrements of ten, and the LED's $80_{-1}$, $80_{-2}$, $80_{-3}$, $80_{-4}$ and $80_{-5}$ are successively lit in accordance with the stepwisely decrease of the reference-level-value "$Y_r$".

After the calculation of the difference "$\Delta Y_{d1}$" between the average-level-value "$Y_a$" and the reference-level-value "$Y_r$", the control proceeds to step 1007, in which the difference "$\Delta Y_{d1}$" is compared with a predetermined permissible value "$Y_t$". Namely, it is determined whether the difference "$\Delta Y_{d1}$" is greater than the permissible value "$Y_t$". Note, in this embodiment, for example, the permissible value "$Y_t$" is previously set to "2".

At step 1007, if $\Delta Y_{d1} > Y_t$, it is determined that there is a nonconformity between the average-level-value "$Y_a$" and the reference-level-value "$Y_r$", i.e. that an overall luminance level of a reproduced image on the monitor 40 does not coincide with a reference-luminance-level defined by the reference-level-value "$Y_r$". Thus, the control proceeds from step 1007 to step 1008, in which it is determined whether the average-level-value "$Y_a$" is greater than the reference-level-value "$Y_r$".

If $Y_a \geq Y_r$, i.e. if the overall luminance level of the reproduced image on the monitor 40 is greater than or equal to the reference-luminance-level to be defined by the reference-level-value "$Y_r$", the control proceeds to step 1009, in which a flag F2 is made to be "1". On the other hand, if $Y_a < Y_r$, i.e. if the overall luminance level of the reproduced image on the monitor 40 is less than the reference-luminance-level to be defined by the reference-level-value "$Y_r$", the control proceeds to step 1010, in which the flag F2 is made to be "0".

Note, the flag F2 indicates a rotational drive-direction in which the motor 58 is to be driven to change the aperture area of the aperture-stop 20. Namely, if F2=1, the motor 58 has to be driven in a rotational direction such that the aperture area of the aperture-stop 20 is decreased, whereby the radiation of light from the distal end of the flexible scope 10 becomes smaller. On the contrary, if F2=0, the motor 58 has to be driven in the reverse rotational direction such that the aperture area of the aperture-stop 20 is increased, whereby the radiation of light from the distal end of the flexible scope 10 becomes larger.

In either case, at step 1011, a number "$P_v$" of drive-clock pulses to be output from the driver circuit 60 to the motor 58 is set in accordance with a magnitude of "$\Delta Y_{d1}$". For example, the setting of "$P_v$" is determined as shown in the following TABLE (I):

TABLE (I)

| $\Delta Y_{d1}$ OR $\Delta Y_{d2}$ | Drive Clock pulses |
|---|---|
| 0~2 | 0 |
| 3~8 | 1 |
| 9~17 | 2 |
| 18~35 | 4 |
| 36~62 | 10 |
| 63~ | 20 |

Namely, the larger the magnitude of "$\Delta Y_{d1}$", the larger the number "$P_v$" of drive-clock pulses. For example, when the magnitude of "$\Delta Y_{d1}$" falls within a range bounded by luminance levels "9" and "17", the number "$P_v$" of drive-clock pulses is set as "2", and, when the magnitude of "$\Delta Y_{d1}$" falls within a range bounded by luminance levels "36" and "62", the number "$P_v$" of drive-clock pulses is set as "10".

Note, a one-dimensional map, corresponding to the above TABLE (I), is previously stored in the RAM 30B of the system control circuit 30, and a number "$P_v$" of drive-clock pulses is immediately obtained from the one-dimensional map in accordance with a magnitude of "$\Delta Y_{d1}$".

At step 1012, the drive motor 58 is rotationally driven in accordance with a value of the flag F2 and a given number "$P_v$" of drive-clock pulses, whereby the aperture area of the aperture-stop 20 is changed and adjusted. Then, the routine once ends.

After the given time (1/30 sec or 1/25 sec) has elapsed, the routine is again executed. In this execution of the routine, the histogram is renewed with a next histogram in the histogram-generating circuit 64, and data "$f_o$", "$Y_a$" and "$f_H$" are also renewed by the calculations based on the renewed histogram. Then, the aperture area of the aperture-stop 20 is changed and adjusted in accordance with the renewed data "$f_o$", "$Y_a$" and "$f_H$", in substantially the same manner as mentioned above. Namely, the adjustment of the aperture area of the aperture-stop 20 is performed such that a conformity between a most-recently-obtained average-level-value "$Y_a$" and the reference-level-value "$Y_r$" can be obtained, i.e. such that an overall luminance level of a reproduced image on the monitor 40 coincides with a reference-luminance-level to be defined by the given reference-level-value "$Y_r$".

Note, as already stated, the larger the magnitude of "$\Delta Y_{d1}$", the larger the number "$P_v$" of drive-clock pulses, and thus it is possible to quickly obtain a conformity between an average-luminance-level-value "$Y_a$" and a reference-luminance-level-value "$Y_r$" although a degree of a unconformity between the "$Y_a$" and "$Y_r$" is relatively large.

When the conformity between the average-level-value "$Y_a$" and the reference-level-value "$Y_r$" is obtained, i.e. when it is confirmed at step 1007 that the difference "$\Delta Y_{d1}$" is equal to or less than the permissible value "$Y_t$". The control proceeds from step 1007 to step 1013, in which it is determined whether the ratio "$t_r$" is greater than the threshold value "$F_r$".

As is apparent form the foregoing, if $t_r \leq F_r$, it is determined that there is no occurrence of a localized halation on a reproduced image displayed by the monitor 40. At this time, the control proceeds from step 1013 to step 1011, in which the number "$P_v$" of drive-clock pulses is set as "0", because the difference "$\Delta Y_{d1}$" is equal to or less than "2" ($Y_t$=2), as shown in the above TABLE (I). Then, although the control proceeds to step 1012, the motor 58 is never driven, due to $P_v=0$.

On the other hand, if $t_r > F_r$, it is determined that there is an occurrence of a localized halation on a reproduced image displayed by the monitor 40. At this time, the control proceeds from step 1013 to step 1014, in which the flag F1 is made to be "1". Then, a count number of a counter C is reset to be "0". Note, a function of the counter C is stated in detail hereinafter.

At step 1016, the flag F2 is made to be "1", and, at step 1017, the number "$P_v$" of drive-clock pulses is set as "6", which is suitably predetermined. Then, at step 1012, by outputting the six drive clock pulses from the driver circuit 60 ($P_v=6$), the motor 58 is driven in the rotational direction such that the aperture area of the aperture-stop 20 is decreased. In short, when it is determined that the localized halation on the reproduced image displayed by the monitor 40 occurs, the aperture area of the aperture-stop 20 is immediately narrowed by a degree corresponding to the six drive clock pulses ($P_v=6$), whereby the occurrence of the localized halation can be suppressed. Then, the routine once ends.

In an execution of the routine after the elapsed time (1/30 sec or 1/25 sec), since F1=1 (step 1014), the control proceeds from step 1005 to step 1018, in which the following calculation is executed:

$$\Delta Y_{d2} \leftarrow |Y_a - (Y_r - Y_c)|$$

Namely, a given value "$Y_c$" is subtracted from the reference-level-value "$Y_r$", and a difference "$\Delta Y_{d2}$" between the most-recently-obtained average-level-value "$Y_a$" and the subtracted or reduced reference-level-value "$(Y_r-Y_c)$" is calculated.

Note, the value "$Y_c$" is suitably predetermined, and, in this embodiment, an initial setting of "10" is given the value "$Y_c$".

At step 1019, the difference "$\Delta Y_{d2}$" is compared with the permissible value "$Y_t$" (=2). Namely, it is determined whether the difference "$\Delta Y_{d2}$" is greater than the permissible value "$Y_t$". If $\Delta Y_{d2} > Y_t$, the control proceeds from step 1019 to step 1020, in which it is determined whether the average-level-value "$Y_a$" is larger than the reduced reference-level-value "$(Y_r-Y_c)$".

If $Y_a \geq (Y_r-Y_c)$, the control proceeds from step 1020 to step 1021, in which the flag F2 is made to be "1". On the other hand, if $Y_a < (Y_r-Y_c)$, the control proceeds from step 1020 to step 1022, in which the flag F2 is made to be "0". As already stated, the flag F2 indicates the rotational drive-direction in which the motor 58 is to be driven to change the aperture area of the aperture-stop 20. Namely, if F2=1, the motor 58 has to be driven in the rotational direction such that the aperture area of the aperture-stop 20 is decreased, and if F2=0, the motor 58 has to be driven in the reverse rotational direction such that the aperture area of the aperture-stop 20 is increased.

In either case, at step 1023, a difference "$\Delta Y_{d1}$" between the average-level-value "$Y_a$" and the reference-level-value "$Y_r$" is calculated in the same manner as at step 1006, as follows:

$$\Delta Y_{d1} \leftarrow |Y_a - Y_r|$$

Then, at step 1024, the difference "$\Delta Y_{d1}$" is compared with a threshold value "$D_y$", which, for example, has a setting of "25", being a relatively-large numerical value.

If $\Delta Y_{d1} > D_y$, the control proceeds to step 1025, in which the count number of the counter C is incremented by "1", and, at step 1026, it is determined whether the count number of the counter C has reached a predetermined constant value "$C_t$", for which a suitable numerical value setting of "5" may be used. If $C < C_t$, the control skips over step 1027 to step 1028, in which a number "$P_v$" of drive-clock pulses to be output from the driver circuit 60 to the motor 58 is set in accordance with a magnitude of "$\Delta Y_{d2}$", as shown in the aforementioned TABLE (I). At step 1029, the drive motor 58 is rotationally driven in accordance with a value of the flag F2 and a given number "$P_v$" of drive-clock pulses. Then, the routine once ends.

Thereafter, although the execution of the routine is repeated at the regular interval of the given time (1/30 sec or 1/25 sec), the adjustment of the aperture area of the aperture-stop 20 is performed until the count number of the counter C reaches the predetermined constant value "$C_t$" (provided that the difference "$\Delta Y_{d1}$" is larger than the threshold value "$D_y$" (step 1024)), such that a conformity between the average-level-value "$Y_a$" and the reduced reference-level-value "$(Y_r-Y_c)$" can be obtained, i.e. such that an overall luminance level of a reproduced image on the monitor 40 coincides with a reference-luminance-level defined by the reduced reference-level-value "$(Y_r-Y_c)$".

Note, in general, when the distal end of the flexible scope 10 is negligibly moved during operation, two histograms, which are consecutively generated in the histogram-generating circuit 64, exhibit a close resemblance to each other. Thus, two average-luminance-level-values ("$Y_a$"), which are derived from the two consecutive histogram, may be considered to be generally equal to each other.

On the other hand, when an operator finds a localized halation occurring on a reproduced image displayed by the monitor 40, the operator has a tendency toward adjusting a position of the distal end of the flexible scope 10, to try to avoid the occurrence of the localized halation. In this case, two average-luminance-level-values ("$Y_a$"), which are derived from the two consecutive histograms, may be greatly different from each other, due to the repositioning of the distal end of the flexible scope 10. As a result, a first difference "$\Delta Y_{d1}$", which is obtained at step 1006 based on the average-luminance-level-value "$Y_a$" derived from the first of the two consecutive histograms, may be greatly different from a second difference "$\Delta Y_{d1}$", which is obtained at step 1023 based on the average-luminance-level-value "$Y_a$" derived from the second of the two consecutive histograms. Thus, the difference "$\Delta Y_{d1}$", which is calculated after the movement of the distal end of the flexible scope 10, may exceed the relatively-large threshold value "$D_y$" (step 1024).

In short, at step 1024, it is monitored whether the distal end of the flexible scope 10 has been moved to try to avoid the occurrence of the localized halation. In reality, after the localized halation occurs, by moving the distal end of the flexible scope 10, the occurrence of the localized halation may be avoided. Accordingly, in this embodiment, at step 1024, if it is confirmed that all of the consecutively-calculated differences "$\Delta Y_{d1}$" are larger than the relatively-large threshold value "$D_y$" over a period taken by the count number of the counter C to reach the constant value "$C_t$" (=5), it is considered that the occurrence of the localized halation has been avoided.

Thus, at step 1026, when the count number of the counter C reaches the constant value "$C_t$" (=5), the control proceeds from step 1026 to step 1027, in which the flag F1 is made to be "0", and the value "$Y_c$" is reset to "10", on the supposition that the occurrence of the localized halation has been avoided. Thereafter, in the consecutive executions of the routine at the regular interval of the given time (1/30 sec or 1/25 sec), the control proceeds from step 1005 to step 1006 (F1=1), and the adjustment of the aperture area of the aperture-stop 20 is performed in the same manner as mentioned above.

Note, the resetting of the value "$Y_c$" at step 1027 is necessary, because the value "$Y_c$" may increase when the occurrence of the localized halation is not avoided, as discussed hereinafter.

On the other hand, at step 1024, even if it is once confirmed that the difference "$\Delta Y_{d1}$" is equal to or smaller than the relatively-large threshold value "$D_y$", until the count number of the counter C reaches the constant value "$C_t$" (=5), it is considered that the occurrence of the localized halation has not been avoided. At that time, the control proceeds from step 1024 to step 1030, in which the count number of the counter C is reset to "0". Then, the control proceeds to step 1023, in which a number "$P_v$" of drive-clock pulses to be output from the driver circuit 60 to the motor 58 is set in accordance with a magnitude of "$\Delta Y_{d2}$" (step 1018), as shown in the aforementioned TABLE (I). At step 1029, the drive motor 58 is rotationally driven in accordance with a value of the flag F2 and a given number "$P_v$" of drive-clock pulses. Namely, the adjustment of the aperture area of the aperture-step 20 is performed such that a conformity between the average-level-value "$Y_a$" and the reduced reference-level-value "$(Y_r-Y_c)$" can be obtained.

At step 1019, when the conformity between the average-level-value "$Y_a$" and the reduced reference-level-value "$(Y_r-Y_c)$" is obtained, i.e. when it is confirmed that the difference "$\Delta Y_{d2}$" is equal to or less than the permissible value "$Y_t$". The control proceeds from step 1019 to step 1031, in which it is again determined whether the ratio "$t_r$" is greater than the threshold value "$F_r$".

At step 1031, if $t_r>F_r$, it is determined that the occurrence of the localized halation has not been avoided. At this time, the control proceeds from step 1031 to step 1032, in which the following calculation is executed:

$$Y_c \leftarrow Y_c + K_c$$

Herein: "$K_c$" is a constant value, which a setting of "4", for example, being more than the permissible value "$Y_t(=2)$", is previously given. Then, the routine once ends.

In the execution of the routine after the elapsed time (⅓₀ sec or ¹⁄₂₅ sec), the control proceeds from step 1005 to step 1018 (F1=1), in which the following calculation is executed:

$$\Delta Y_{d2} \leftarrow |Y_a - (Y_r - Y_c)|$$

Namely, an increased value "$Y_c$" (=10+4), obtained at step 1032, is subtracted from the reference-level-value "$Y_r$", and a difference "$\Delta Y_{d2}$" between the most-recently-obtained average-level-value "$Y_a$" and the reduced reference-level-value "$(Y_r-Y_c)$" is calculated. Of course, in the above formula, the reduced reference-level-value "$(Y_r-Y_c)$" is smaller than the reduced reference-level-value "$(Y_r-Y_c)$" of the previous execution of the routine, due to the increased value "$Y_c$" (=10+4). Thus, the adjustment of the aperture area of the aperture-step 20 is performed such that a conformity between the average-level-value "$Y_a$" and the further reduced reference-level-value "$(Y_r-Y_c)$" can be obtained, whereby the occurrence of the localized halation can be more quickly and effectively can avoided.

Note, of course, in the consecutive executions of the routine, if the occurrence of the localized halation is still not avoided, the value "$Y_c$" is yet further increased at step 1032, for avoidance of the occurrence of the localized halation.

At step 1031, if $t_r \leq F_r$, it is determined that a localized halation on a reproduced image displayed by the monitor 40 does not occur. Then, the routine once ends. Thereafter, in consecutive executions of the routine, as long as F1=1, the adjustment of the aperture area of the aperture-step 20 is performed such that a conformity between the average-level-value "$Y_a$" and the reduced reference-level-value "$(Y_r-Y_c)$" can be obtained.

Of course, during consecutive executions of the routine, when the flag F1 is made to be "0" at step 1027, the adjustment of the aperture area of the aperture-step 20 is performed such that a conformity between the average-level-value "$Y_a$" and the reference-level-value "$Y_r$" can be obtained.

Note, following five consecutive executions of the routine, the flag F1 will almost always become "0" (step 1027), because the distal end of the flexible scope 10 is sure to be moved each execution. In particular, due to an operator's inherent movement of the distal end of the flexible scope 10, all of the consecutively-calculated differences "$\Delta Y_{d1}$" are usually inevitably larger than the relatively-large threshold value "$D_y$" over a period taken by the count number of the counter C to reach the constant value "$C_t$" (=5), and thus the routine passes through step 1027, in which the flag F1 is made to be "0".

Figure 12:
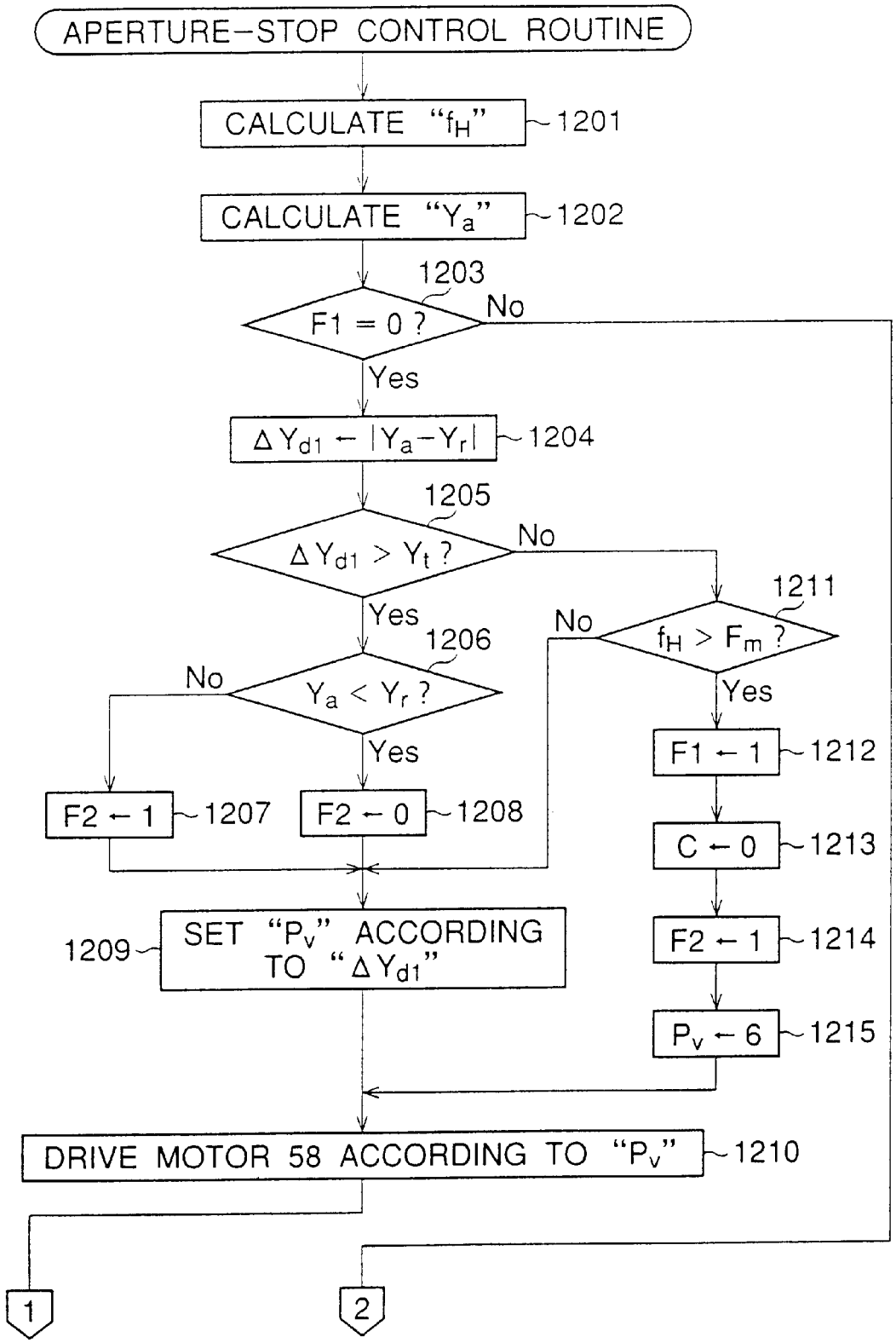
FIG. 12 is a part of a flowchart of a modification of the aperture-stop control routine shown in FIGS. 10 and 11.
Figure 13:
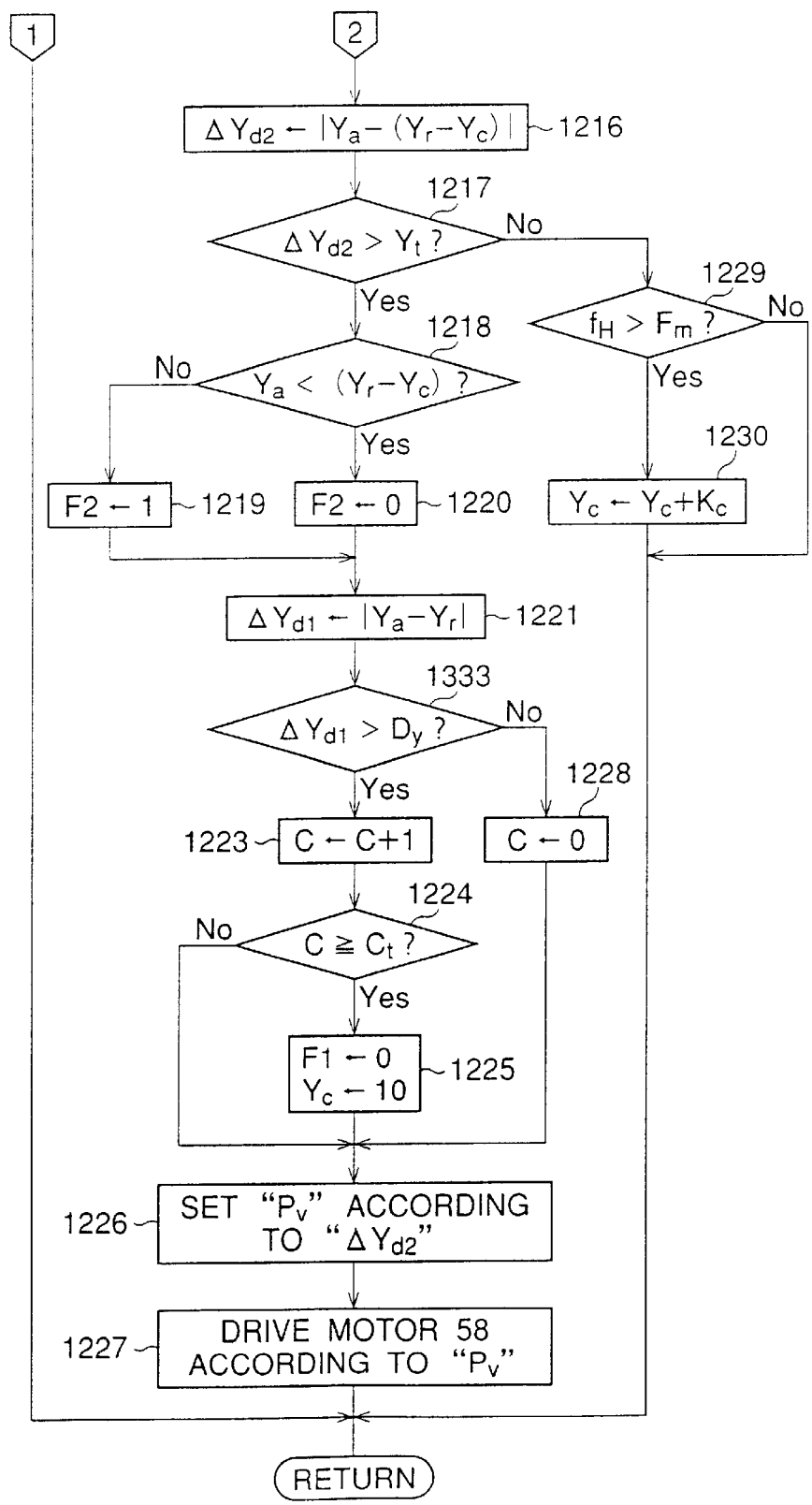
FIG. 13 is a remaining part of the flowchart of the modification of the aperture-stop control routine shown in FIGS. 10 and 11.

FIGS. 12 and 13 show a flowchart of a modification of the aperture-stop control routine shown in FIGS. 10 and 11, executed by the system control circuit 30.

At step 1201, a specific frequency (number) "$f_H$" of luminance signals, included in the specific range ($V_h \leq X \leq 255$) of the histogram bounded by the maximum luminance level "255" and the specific luminance level "$V_h$", is calculated. Then, at step 1202, an average-luminance-level-value "$Y_a$" is calculated in accordance with the aforementioned formula.

Steps 1203 through 1230 correspond to steps 1005 through 1032 of the routine shown in FIGS. 10 and 11, and an adjustment of the aperture area of the aperture-stop 20 is performed in substantially the same manner as in the routine of FIGS. 10 and 11, except that an occurrence of a localized halation is determined by comparing the specific frequency "$f_H$" with a threshold value "$F_m$". In particular, at steps 1211 and 1229, corresponding to steps 1013 and 1031 of FIGS. 10 and 11, respectively, it is determined whether the specific frequency "$f_H$" is larger than the threshold value "$F_m$". If $f_H > F_m$, it is determined that there is an occurrence of a localized halation on a reproduced image displayed by the monitor 40, and, if $f_H \leq F_m$, it is determined that there is no occurrence of a localized halation on a reproduced image displayed by the monitor 40.

The threshold value "$F_m$" is suitably set in accordance with a total number of luminance signals included in one frame. For example, when the total number of luminance signals included in one frame is 65,000, a setting of 7,000 may be given the threshold value "$F_m$".

Figure 14:
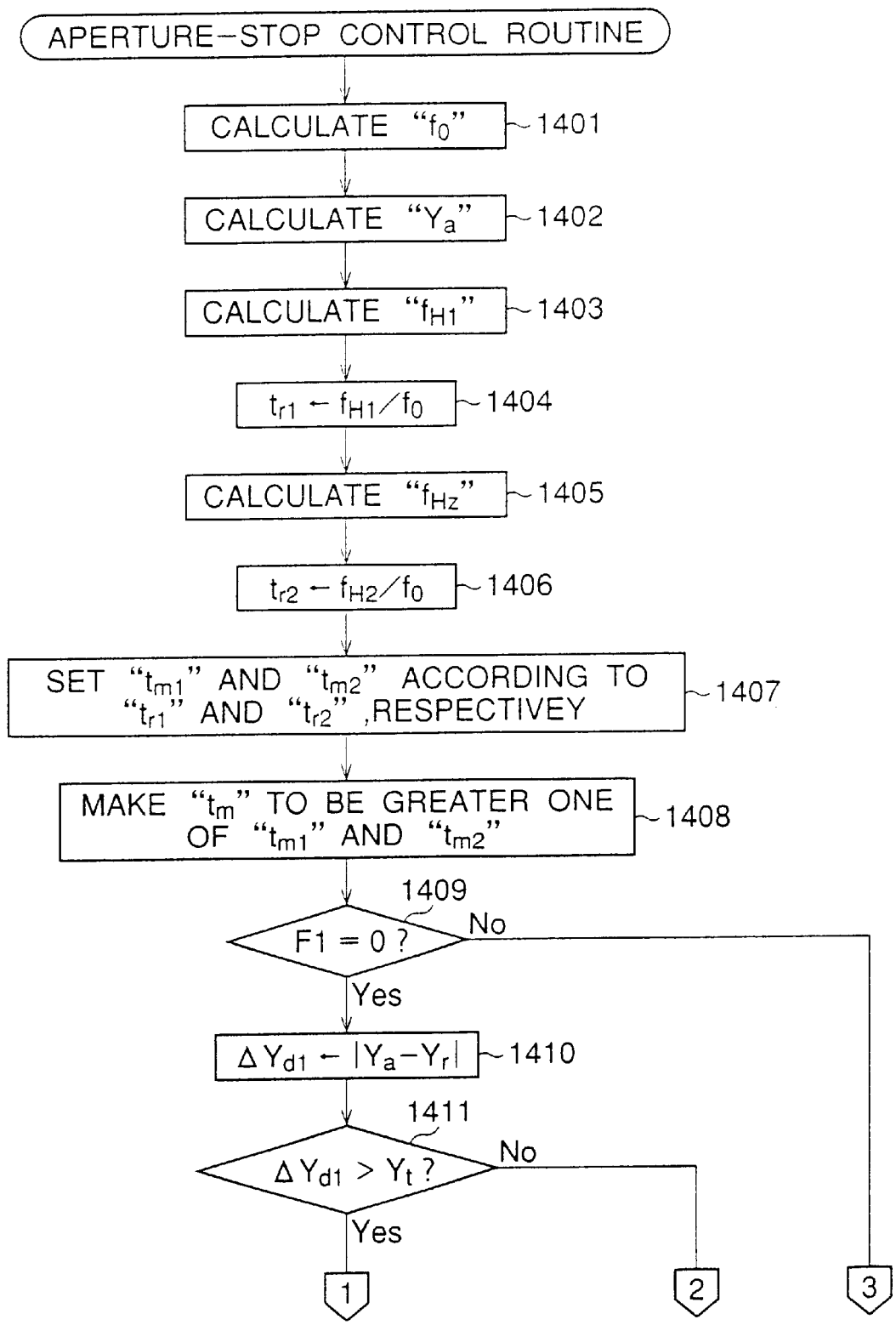
FIG. 14 is a part of a flowchart of another aperture-stop control routine executed in the system control circuit of the electronic endoscope of FIG. 1.
Figure 15:
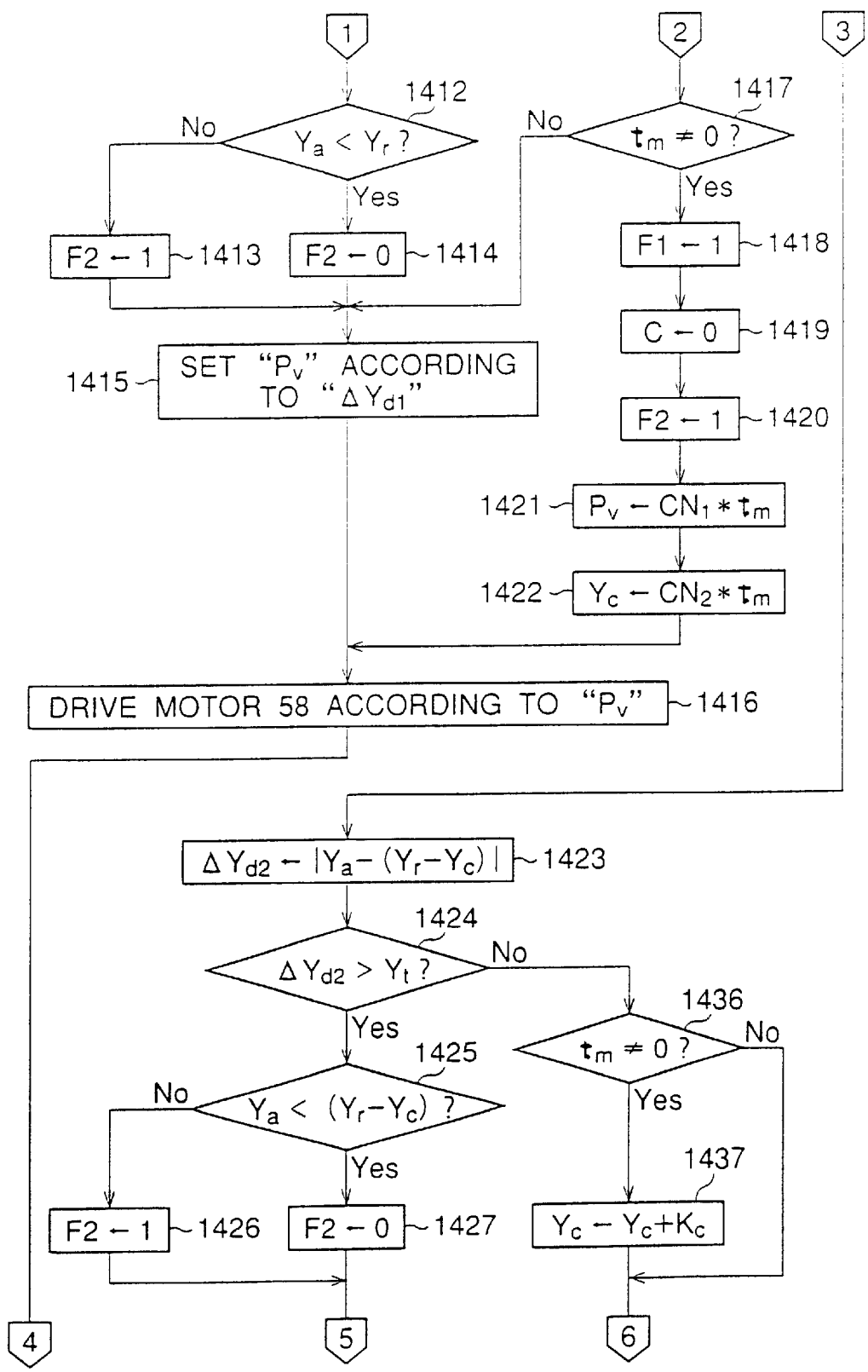
FIG. 15 is another part of the flowchart of the aperture-stop control routine referred to in FIG. 14.
Figure 16:
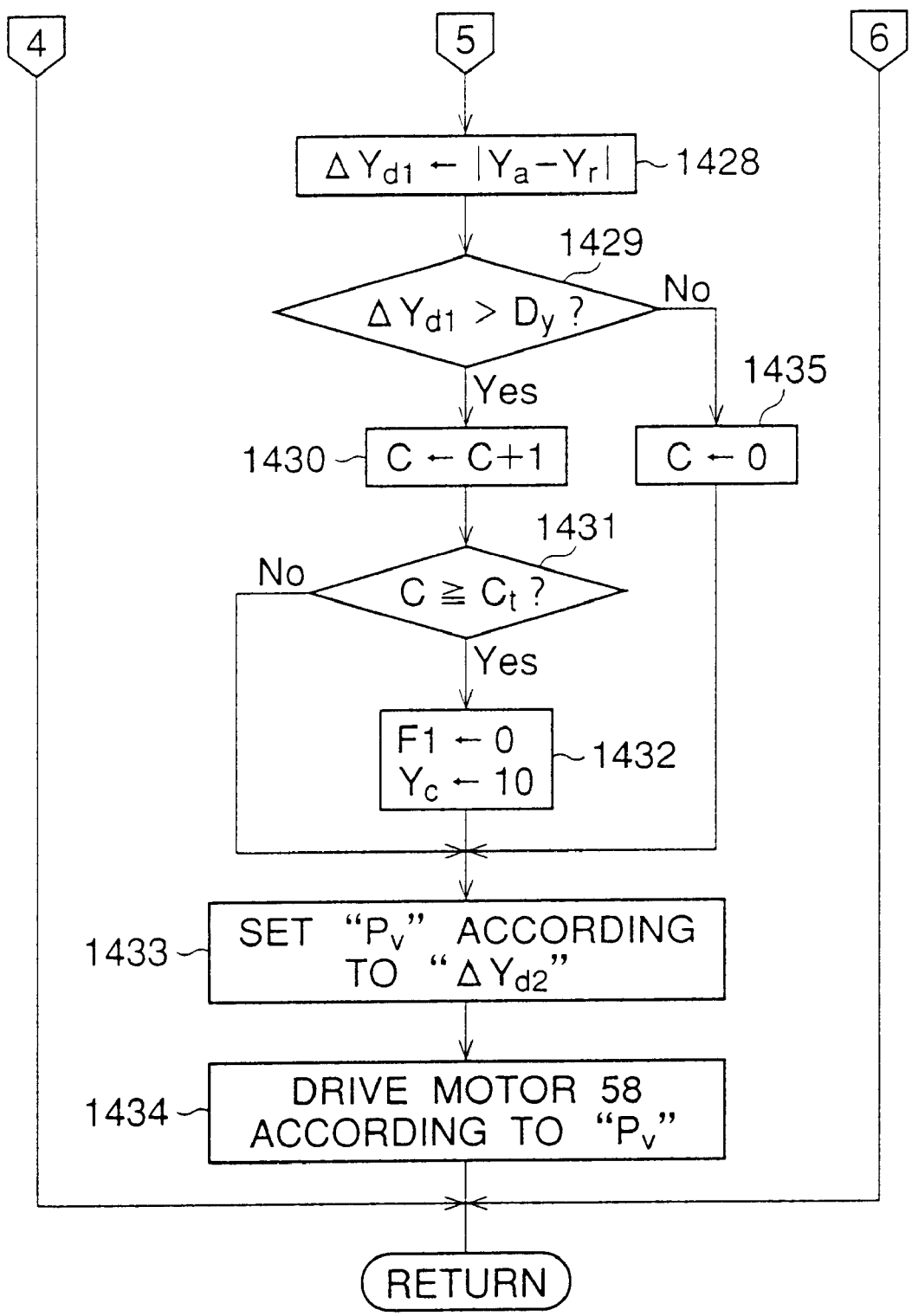
FIG. 16 is a remaining part of the flowchart of the aperture-stop control routine referred to in FIG. 14.

FIGS. 14, 15 and 16 show a flowchart of another aperture-stop control routine, which may be executed by the system control circuit 30. This aperture-stop control routine is also constituted as a time-interruption routine, and this time-interruption routine is repeatedly executed at a regular time-interval, which is predetermined in accordance with a used image-reproduction method, such as the NTSC system, the PAL system or the like.

Figure 17:
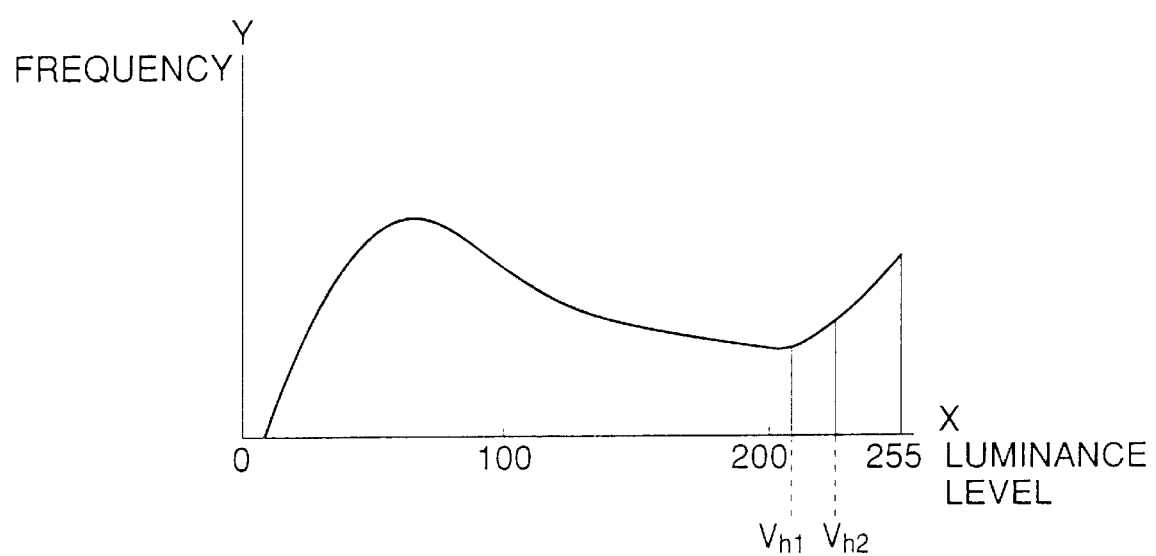
FIG. 17 is a graph showing a histogram, similar to the histogram of FIG. 8, featuring an occurrence of a localized halation, for explanation of the aperture-stop control routine shown in FIGS. 14, 15 and 16.

For an execution of this aperture-stop control routine, as shown in FIG. 17, a first specific range is bounded by the maximum luminance level "255" and a first specific luminance level "$V_{h1}$", and a second specific range is bounded by the maximum luminance level "255" and a second specific luminance level "$V_{h2}$". Similar to the aforementioned specific luminance level "$V_h$", each of the first and second specific luminance levels "$V_{h1}$" and "$V_{h2}$" is suitably selected from the luminance level-range between luminance levels "200" and "230", but, in this embodiment, the first specific luminance level "$V_{h1}$" is less than the second specific luminance level "$V_{h2}$".

The first and second specific luminance levels "$V_{h1}$" and "$V_{h2}$" may be suitably set in accordance with a category of flexible scope (10), by executing a scope-identification routine as shown in FIG. 9. Alternatively, the specific luminance levels "$V_{h1}$" and "$V_{h2}$" may be manually set through the keyboard 67 (FIG. 1) in accordance with a category of flexible scope (10) connected to the video-signal processing unit 12. In this embodiment, for example, a setting of "210" is given to the first specific luminance level "$V_{h1}$", and a setting of "225" is given to the second luminance level "$V_{h2}$".

At step 1401, a total number "$f_o$" of luminance signals, included in the full histogram-definition range ($0 \leq X \leq 255$) of a histogram generated in the histogram-generating circuit 64, is calculated. Then, at step 1402, an average-luminancelevel-value "$Y_a$" is calculated, using the total number "$f_o$" obtained at step 1401, in accordance with the aforementioned formula.

At step 1403, a first specific frequency (number) "$f_{H1}$" of luminance signals, included in the first specific range ($V_{h1} \leq X \leq 255$) of the histogram bounded by the maximum luminance level "255" and the first specific luminance level "$V_{h1}$", is calculated. Then, At step 1404, the following calculation is executed:

$$t_{r1} \leftarrow f_{H1}/f_o$$

Namely, a first ratio "$t_{r1}$" of the first specific frequency (number) "$f_{H1}$" to the total number "$f_o$" is calculated, and is temporarily stored in the RAM 30C (FIG. 6) of the system control circuit 30.

At step 1405, a second specific frequency (number) "$f_{H2}$" of luminance signals, included in the second specific range ($V_{h2} \leq X \leq 255$) of the histogram bounded by the maximum luminance level "255" and the second specific luminance level "$V_{h2}$", is calculated. Then, At step 1406, the following calculation is executed:

$$t_{r2} \leftarrow f_{H2}/f_o$$

Namely, a second ratio "$t_{r2}$" of the second specific frequency (number) "$f_{H2}$" to the total number "$f_o$" is calculated, and is temporarily stored in the RAM 30C (FIG. 6) of the system control circuit 30.

At step 1407, a first variable value "$t_{m1}$" and a second variable value "$t_{m2}$" are set in accordance with the first and second ratios "$t_{r1}$" and "$t_{r2}$", respectively, as shown in a following TABLE (II):

TABLE (II)

| $t_{r1}, t_{r2}$ (%) | 0~6 | 6~12 | 12~18 | 18~24 | 24~ | |
|---|---|---|---|---|---|---|
| $V_{h1}$ (210) | 0 | 0 | 1 | 2 | 3 | $t_{m1}$ |
| $V_{h2}$ (225) | 0 | 1 | 2 | 3 | 4 | $t_{m2}$ |

Namely, if $0\% \leq t_{r1} < 12\%$, the first variable value "$t_{m1}$" is set to "0"; if $12\% \leq t_{r1} < 18\%$, the first variable value "$t_{m1}$" is set to "1"; if $18\% \leq t_{r1} < 24\%$, the first variable value "$t_{m1}$" is set to "2"; and, if $24\% \leq t_{r1}$, the first variable value "$t_{m1}$" is set to "3". Also, if $0\% \leq t_{r2} < 6$, the second variable value "$t_{m2}$" is set to "0"; if $6\% \leq t_{r2} < 12\%$, the second variable value "$t_{m2}$" is set to "1"; if $12\% \leq t_{r2} < 18\%$, the second variable value "$t_{m2}$" is set to "2"; if $18\% \leq t_{r2} < 24\%$, the second variable value "$t_{m2}$" is set to "3"; and, if $24\% \leq t_{r2}$, the second variable value "$t_{m2}$" is set to "4".

Note, a one-dimensional map, corresponding to the above TABLE (II), is previously stored in the ROM 30B of the system control circuit 30, and each setting of the variable values "$t_{m1}$" and "$t_{m2}$" is obtained from the one-dimensional map in accordance with a magnitude of a corresponding ratio ("$t_{r1}$" or "$t_{r2}$").

At step 1408, a variable value "$t_m$" is made to be a greater one of the variable values "$t_{m1}$" and "$t_{m2}$". Of course, when the variable values "$t_{m1}$" and "$t_{m2}$" exhibit a same value, the variable value "$t_m$" is made to be the same value. In this embodiment, when the variable value "$t_m$" exhibits "0", it is determined that there is no occurrence of a localized halation on a reproduced image displayed by the monitor 40. Namely, If $t_m \geq 1$, it is determined that there is an occurrence of a localized halation on a reproduced image on the monitor 40, and the greater the variable value "$t_m$", the higher a degree of the occurring localized halation.

Note, in this embodiment, only one of the first and second variable values "$t_{m1}$" and "$t_{m2}$" may be substituted for the variable value "$t_m$".

Respective steps 1409 to 1416 correspond to steps 1005 to 1012 of the aperture-stop control routine shown in FIGS. 10 and 11. Namely, when there is no occurrence of the localized halation on the reproduced image displayed by the monitor 40 (F1=0), an adjustment of the aperture area of the aperture-step 20 is performed such that a conformity between the average-level-value "$Y_a$" and the reference-level-value "$Y_r$" can be obtained. Note, of course, a setting of "$P_v$" is performed in accordance with the aforementioned TABLE (I).

When the conformity between the average-level-value "$Y_a$" and the reference-level-value "$Y_r$" is obtained, i.e. when it is confirmed at step 1411 that a difference "$\Delta Y_{d1}$" is less than or equal to the permissible value "$Y_t$". The control proceeds from step 1411 to step 1417, in which it is determined whether the variable value "$t_m$" is not equal to "0".

As mentioned above, if $t_m=0$, it is determined that there is no occurrence of a localized halation on a reproduced image displayed by the monitor 40. At this time, the control proceeds from step 1417 to step 1415, in which a number "$P_v$" of drive-clock pulses is set to "0", because the difference "$\Delta Y_{d1}$" is equal to or less than "2" ($Y_t$=2), as shown in the above TABLE (I). Then, although the control proceeds to step 1416, the motor 58 is never driven, due to $P_v$=0.

In short, as long as $t_m=0$, an adjustment of the aperture area of the aperture-step 20 is merely performed such that a conformity between the average-level-value "$Y_a$" and the reference-level-value "$Y_r$" can be obtained, i.e. such that the difference "$\Delta Y_{d1}$" falls within the permissible value "$Y_t$" (=2).

On the other hand, if $t_m \neq 0$, it is determined that there is an occurrence of a localized halation on a reproduced image displayed by the monitor 40. At this time, the control proceeds from step 1417 to step 1418, in which the flag F1 is made to be "1". Then, at step 1419, a count number of the counter C is reset to "0", and, at step 1420, the flag F2 is made to be "1". Note, of course, functions of the counter C and the flag F2 are the same as in the aperture-stop control routine shown in FIGS. 10 and 11.

At step 1421, the number "$P_v$" of drive-clock pulses is calculated as follows:

$$P_v \leftarrow CN_1 * t_m$$

Herein: "$CN_1$" is a suitable constant value of, for example, "3".

As mentioned above, the greater the variable value "$t_m$", the higher the degree of the occurring localized halation. In other words, the higher the degree of the occurring localized halation, the greater the calculated result of "$P_v$".

At step 1422, a value "$Y_c$", which should be subtracted from the reference-level-value "$Y_r$" during the occurrence of the localized halation (step 1423), is calculated as follows:

$$Y_c \leftarrow CN_2 * t_m$$

Herein: "$CN_2$" is a suitable constant value of, for example, "4".

As is apparent from this calculation, the higher the degree of the occurring localized halation, the greater the calculated result of "$Y_c$".

Then, at step 1416, the motor 58 is driven such that the aperture area of the aperture-stop 20 is narrowed (F2=1 at step 1420) by a degree corresponding to the drive-clock-pulse-number "$P_v$" calculated at step 1421, whereby the occurrence of the localized halation can be effectively suppressed, due to, of course, the setting of a greater value to the drive-clock-pulse-number "$P_v$" in accordance with the degree of the occurring localized halation (step 1421).

In the execution of the routine after the elapsed time (1/30 sec or 1/25 sec), the control proceeds from step 1409 to step 1423 (F1=1 set at step 1418). Respective steps 1423 through 1437 correspond to steps 1018 through 1032 of the aperture-stop control routine shown in FIGS. 10 and 11. Thus, at step 1423, the following calculation is executed:

$$\Delta Y_{d2} \leftarrow |Y_a - (Y_r - Y_c)|$$

Namely, the value "$Y_c$", obtained at step 1422, is subtracted from the reference-level-value "$Y_r$", and a difference "$\Delta Y_{d2}$" between the most-recently-obtained average-level-value "$Y_a$" and the subtracted or reduced reference-level-value "$(Y_r - Y_c)$" is calculated. Thus, an adjustment of the aperture area of the aperture-step 20 is performed such that a conformity between the average-level-value "$Y_a$" and the reduced reference-level-value "$(Y_r - Y_c)$" can be obtained in substantially the same manner as mentioned above, except that the occurrence of the localized halation can be more effectively suppressed and avoided in comparison with the aperture-stop control routine of FIGS. 10 and 11, because of the setting of a greater value to the value "$Y_c$" in accordance with the degree of the occurring localized halation (step 1422).

In short, according to the aperture-stop control routine shown in FIGS. 14 through 16, a degree of an occurring localized halation on a reproduced image displayed by the monitor 40 is numerically estimated, and the occurrence of the localized halation can be effectively and quickly avoided in accordance with the degree of the occurring localized halation.

Figure 18:
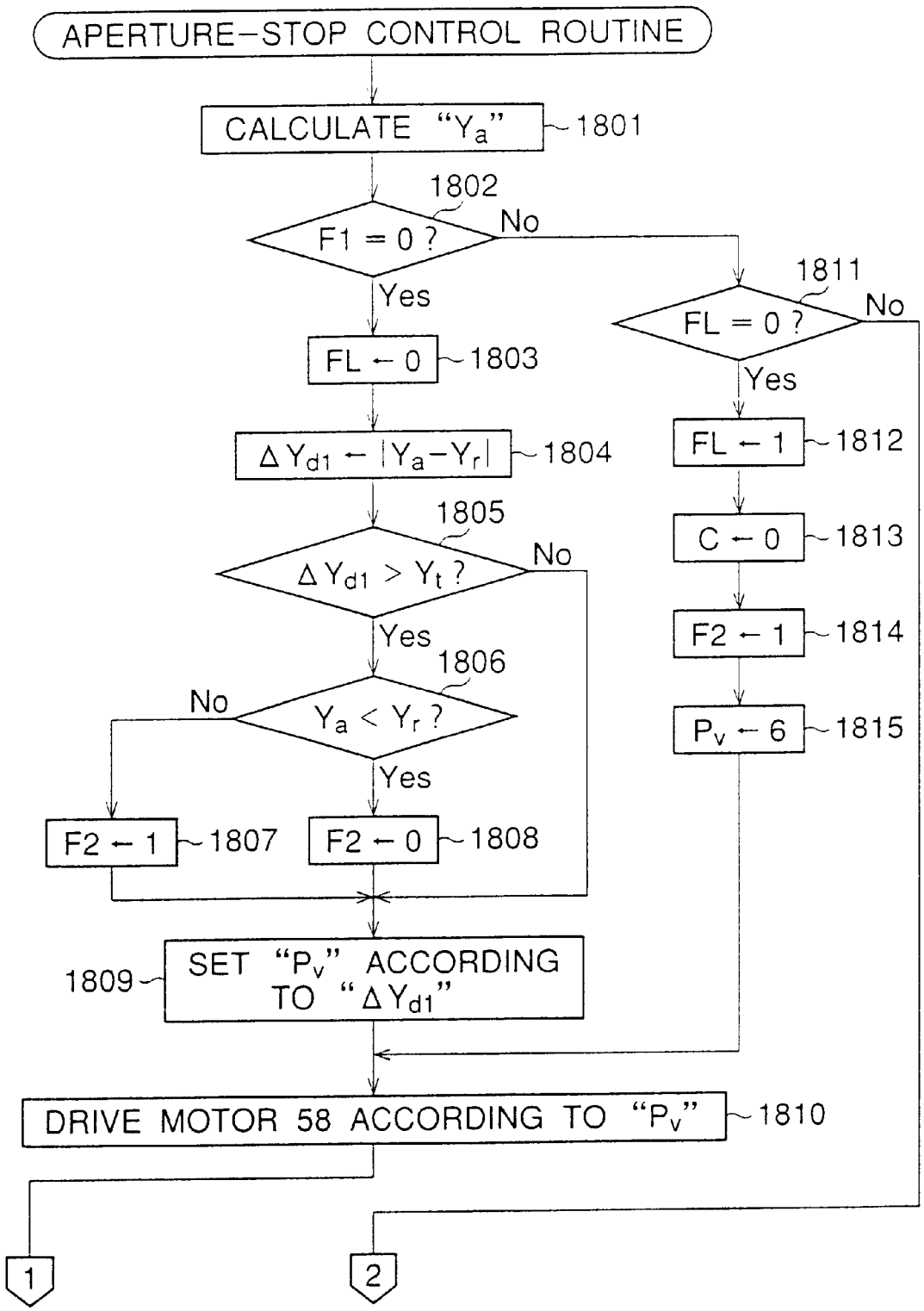
FIG. 18 is a part of a flowchart of yet another aperture-stop control routine executed in the system control circuit of the electronic endoscope of FIG. 1.
Figure 19:
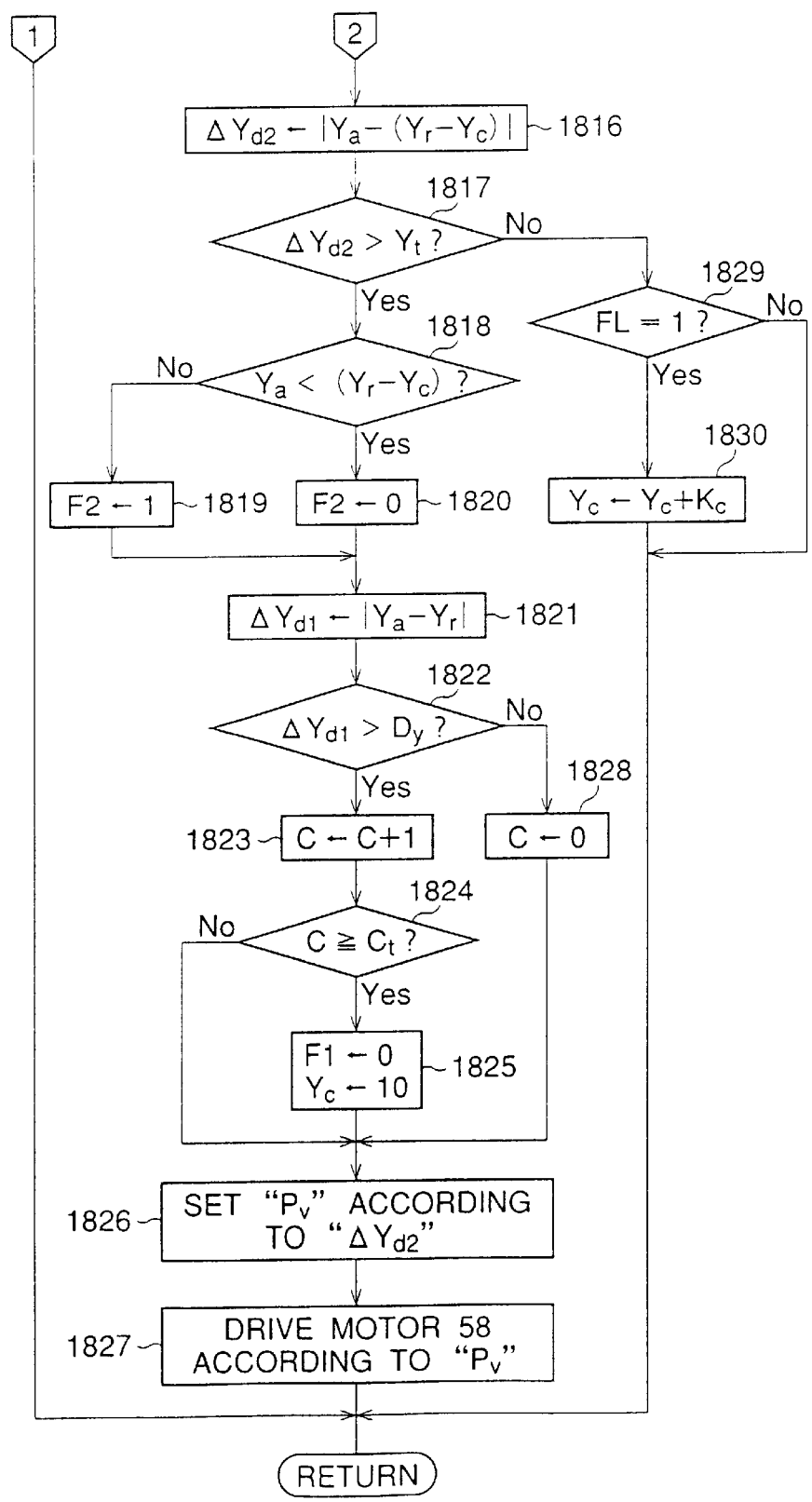
FIG. 19 is a remaining part of the flowchart of the aperture-stop control routine referred to in FIG. 18.

FIGS. 18 and 19 show a flowchart of yet another aperture-stop control routine which may be executed by the system control circuit 30. This aperture-stop control routine is also constituted as a time-interruption routine, and this time-interruption routine is repeatedly executed at a regular time-interval which is predetermined in accordance with a used image-reproduction method, such as the NTSC system, the PAL system or the like.

In this aperture-stop control routine, by an operator manipulating the keyboard 67, it is determined whether a localized halation occurs on a reproduced image displayed by the monitor 40.

At step 1801, an average-luminance-level-value "$Y_a$" is calculated in accordance with the aforementioned formula. Then, at step 1802, it is determined whether a flag F1 is "0" or "1". A changing of the flag F1 from "0" to "1" is performed by the operator manipulating the keyboard 67. Namely, when the operator observes a localized halation occurring on a reproduced image displayed by the monitor 40, he is obligated to depress a predetermined function key on the keyboard 67, resulting in the changing of the flag F1 from "0" to "1".

At step 1802, if F1=0, the control proceeds to step 1803, in which a flag FL is made to be "0". Namely, the flag FL (=0) is set to correspond to the flag F1 such that flag FL is made to be "0" when the flag F1 (=0).

Respective steps 1804 through 1810 correspond to steps 1006 through 1012 of the aperture-stop control routine shown in FIGS. 10 and 11. Namely, as long as F1=0, and therefore FL=0, i.e. as long as it is determined by the operator that there is no occurrence of the localized halation on the reproduced image displayed by the monitor 40, an adjustment of the aperture area of the aperture-step 20 is merely performed such that a conformity between the average-level-value "$Y_a$" and the reference-level-value "$Y_r$" can be obtained in substantially the same manner as mentioned above.

At step 1802, when it is confirmed that the flag F1 has been set to "1", i.e. when the predetermined function key on the keyboard 67 is depressed by the operator, the control proceeds from step 1802 to step 1811, in which it determined whether the flag FL is "0" or "1". At this stage, since FL=0, the control proceeds to step 1812, in which the flag FL is made to be "1". Namely, the flag FL (=1) is set to correspond to the flag F1 (=1).

At step 1813, a count number of the counter C is reset to be "0", and, at step 1814, the flag F2 is made to be "1". Note, of course, functions of the counter C and the flag F2 are the same as in the aperture-stop control routine shown in FIGS. 10 and 11. Then, at step 1815, the number "$P_v$" of drive-clock pulses is set to "6", in the same manner as mentioned above. Thus, at step 1810, by outputting the six drive clock pulses from the driver circuit 60, the motor 58 is driven in the rotational direction such that the aperture area of the aperture-stop 20 is decreased, whereby the occurrence of the localized halation can be suppressed.

In the execution of the routine after the elapsed time (1/30 sec or 1/25 sec), the control proceeds from step 1802 to step 1816 via step 1811 (F1=1 and FL=1). Steps 1816 through 1830 correspond to steps 1018 through 1032 of the aperture-stop control routine shown in FIGS. 10 and 11. Thus, at step 1816, the following calculation is executed:

$$\Delta Y_{d2} \leftarrow |Y_a - (Y_r - Y_c)|$$

Namely, a given value "$Y_c$" is subtracted from the reference-level-value "$Y_r$", and a difference "$\Delta Y_{d2}$" between the most-recently-obtained average-level-value "$Y_a$" and the subtracted or reduced reference-level-value "$(Y_r - Y_c)$" is calculated. Thus, an adjustment of the aperture area of the aperture-step 20 is performed such that a conformity between the average-level-value "$Y_a$" and the reduced reference-level-value "$(Y_r - Y_c)$" can be obtained in substantially the same manner as mentioned above.

Although the present invention is described with respect to an electronic endoscope using the RGB field sequential-type color imaging system, the present invention is applicable to any other electronic endoscope featuring a CCD image sensor with an RGB color filter.

Finally, it will be understood by those skilled in the art that the foregoing description is of preferred embodiments of the device, and that various changes and modifications may be made to the present invention without departing from the spirit and scope thereof.

The present disclosure relates to subject matters contained in Japanese Patent Application No. 10-181171 (filed on Jun. 26, 1998) which is expressly incorporated herein, by reference, in its entirety.

What is claimed is:

1. An electronic endoscope comprising:
   a flexible scope having an image sensor provided at a distal end of said scope;
   a video-signal processing unit, to which a proximal end of said flexible scope is connected, that processes image-pixel signals successively read from said image sensor;
   a light source provided in said video-signal processing unit such that light, emitted from said light source, is guided through said flexible scope and radiates from the distal end of said flexible scope;
   a light-emission regulator associated with said light source that regulates the radiation of light from the distal end of said flexible scope;

a histogram generator that successively generates a luminance-signal-histogram in accordance with said processed image-pixel signals;

a first controller that controls said light-emission regulator in accordance with said luminance-signal-histogram, such that an image having a constant luminance level is reproduced in accordance with said processed image-pixel signals;

a determiner that determines whether a localized halation occurs on said reproduced image on the basis of said luminance-signal-histogram; and a second controller that controls said light-emission regulator to forcibly decrease the radiation of light from the distal end of said flexible scope, thereby avoiding said localized halation occurrence.

2. An electronic endoscope as set forth in claim 1, wherein said generation of said luminance-signal-histogram by said histogram generator is based on a frame of image-pixel signals extracted from said processed image-pixel signals.

3. An electronic endoscope as set forth in claim 1, wherein said generation of said luminance-signal-histogram by said histogram generator is based on a field of image-pixel signals extracted from said processed image-pixel signals.

4. An electronic endoscope as set forth in claim 1, wherein said first controller includes a calculator that calculates an average luminance level-value in accordance with luminance signals representing luminance levels of said luminance-signal-histogram, and controls said light-emission regulator such that said average luminance level-value coincides with a given reference-luminance-level-value.

5. An electronic endoscope as set forth in claim 4, further comprising a manual adjuster that adjusts a magnitude of said reference-luminance-level-value.

6. An electronic endoscope as set forth in claim 1, further comprising:

a monitor that monitors whether a difference between said average luminance level-value and said reference-luminance-level value is more than a predetermined relatively-large threshold value over a given time period after said localized halation occurrence; and a halation-avoidance-determiner that determines that said localized halation occurrence is avoided when it is confirmed by said monitor that said difference is more than said predetermined relatively-large threshold value over said given time period.

7. An electronic endoscope as set forth in claim 1, wherein said determiner includes a frequency calculator that calculates a specific frequency of luminance signals, included in a specific range of the luminance-signal-histogram bounded by a maximum luminance level and a given specific luminance level thereof, said determiner determining whether said localized halation occurs based on said specific frequency of luminance signals.

8. An electronic endoscope comprising:

a flexible scope having an image sensor provided at a distal end of said scope;

a video-signal processor, to which a proximal end of said flexible scope is connected, that processes image-pixel signals successively read from said image sensor;

a light source provided in said video-signal processor such that light, emitted from said light source, is guided through said flexible scope and radiates from the distal end of said flexible scope;

a light-emission regulator associated with said light source that regulates the radiation of light from the distal end of said flexible scope;

a histogram generator that successively generates a luminance-signal-histogram in accordance with said processed image-pixel signals;

a first controller that controls said light-emission regulator in accordance with said luminance-signal-histogram, such that an image having a constant luminance level is reproduced in accordance with said processed image-pixel signals;

a determiner that determines whether a localized halation occurs on said reproduced image, said determiner comprising a frequency calculator, which calculates a specific frequency of luminance signals included in a specific range of the luminance-signal-histogram, bounded by a maximum luminance level and a given specific luminance level, a ratio calculator, which calculates a ratio of said specific frequency of luminance signals to a total number of luminance signals included in said luminance-signal-histogram, and a comparator, which compares said ratio with a given threshold value, said determiner determining that the localized halation occurs when said ratio exceeds said threshold value; and a second controller that controls said light-emission regulator to forcibly decrease the radiation of light from the distal end of said flexible scope, thereby avoiding said localized halation occurrence.

9. An electronic endoscope as set forth in claim 8, wherein said determiner further includes a numerical estimator that numerically estimates a magnitude of said ratio, and a halation-degree-determiner that determines a degree of said localized halation in accordance with the numerical estimation of said magnitude of said ratio, the forcible decrease in said radiation of light from the distal end of said flexible scope being performed by said second controller in accordance with the degree of said occurrence of said localized halation.

10. An electronic endoscope as set forth in claim 7, wherein said determiner further includes a comparator that compares said specific frequency of luminance signals with a given threshold value, said determiner determining that said localized halation occurs when it is confirmed by said comparator that said specific frequency of luminance signals exceeds said threshold value.

11. An electronic endoscope as set forth in claim 1, wherein said determiner includes an indicator that indicates said localized halation occurrence, the forcible decrease in the radiation of light from the distal end of said flexible scope being performed by said second controller when said localized halation occurrence is indicated by said indicator.

12. An electronic endoscope comprising:

an flexible scope for reaching inside a bodily cavity;

an optical system within said flexible scope that forms an image of a portion of the bodily cavity on an image sensor, the image sensor generating a detected image signal;

a regulated light source system associated with said flexible scope that illuminates the bodily cavity, said regulated light source system varying illumination to maintain a substantially constant average luminance of the detected image signal; and a halation override system that monitors a luminance distribution histogram of the detected image signal and, when the luminance distribution histogram indicates the presence of a halation by a histogram shape having a high luminance anomaly, overrides the maintaining of the substantially constant average luminance of the detected image signal by forcing a reduction in illumination to reduce halation.

* * * * *